US006480825B1

(12) United States Patent
Sharma et al.

(10) Patent No.: US 6,480,825 B1
(45) Date of Patent: *Nov. 12, 2002

(54) SYSTEM AND METHOD FOR DETECTING A RECORDED VOICE

(75) Inventors: Manish Sharma, Somerset; Richard J. Mammone, Bridgewater, both of NJ (US)

(73) Assignee: T-NETIX, Inc., Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,393

(22) Filed: Jan. 29, 1998

Related U.S. Application Data
(60) Provisional application No. 60/036,773, filed on Jan. 31, 1997.

(51) Int. Cl.[7] .............................................. G01L 17/00
(52) U.S. Cl. ...................... 704/270; 704/273; 704/275; 379/67; 379/88
(58) Field of Search ................................ 704/270, 273, 704/275; 379/88.01, 67

(56) References Cited

U.S. PATENT DOCUMENTS

| | | | | |
|---|---|---|---|---|
| 4,843,377 A | * | 6/1989 | Fuller et al. ................ 340/573 |
| 5,335,265 A | * | 8/1994 | Cooper et al. ................ 379/59 |
| 5,548,647 A | * | 8/1996 | Naik et al. .................... 381/42 |
| 5,608,784 A | * | 3/1997 | Miller ........................ 379/88 |
| 5,897,616 A | * | 4/1999 | Kanevsky et al. .......... 704/273 |
| 5,901,203 A | * | 5/1999 | Morganstein et al. ..... 379/88.02 |
| 5,913,196 A | * | 6/1999 | Talmor et al. .............. 704/273 |
| 5,940,799 A | * | 8/1999 | Bruckert et al. ........... 704/273 |

* cited by examiner

Primary Examiner—William Korzuch
Assistant Examiner—Susan McFadden
(74) Attorney, Agent, or Firm—Merchant & Gould; Thomas H. Young

(57) ABSTRACT

The present invention is a reliable system and method for detecting a recorded voice, which can be employed independently or to provide protection from fraudulent use of a recording to defeat an automatic speaker recognition system. Several techniques and systems are employed either independently or in combination to verify that a detected audio sample is live and not recorded. Temporal speech characteristics of an audio sample are analyzed to determine whether a sample under examination is so similar to a previous sample as to indicate a recording. Communications channel characteristics are examined to determine whether an sample was recorded on a different channel from a predetermined communications channel. A pattern classifier is trained to distinguish between live and recorded speech. Finally, an "audio watermark" is used to determine whether a detected audio sample is a recording of a previous communication by an authorized user. In addition, the various techniques of the present invention may be employed in serial or parallel combination with a variety of decision-making schemes to provide increased performance.

6 Claims, 14 Drawing Sheets

```
//PROCESSING FRAME SIZE, N, IN TERMS OF NUMBER OF SAMPLES.
//TYPICALLY, CORRESPONDING TO 5 TO 10 MILLISECONDS.
//AN ODD NUMBER IS RECOMMENDED AS A CHOICE FOR N.
FRAME SIZE = N

//SHIFT BETWEEN TWO CONSECUTIVE PROCESSING FRAMES
FRAME SHIFT = K

//LENGTH OF THE SPEECH DATA, IN TERMS OF NUMBER OF SAMPLES
SPEECHLENGTH = M

//CALCULATE THE NUMBER OF FRAMES REQUIRED, GIVEN THE TOTAL NUMBER OF SPEECH SAMPLES
MAXFRAMECOUNT = ((M-N)/K) + 1
```

```
FRAME COUNT = 1
IF (SPEECH_SAMPLE [N/2] IS THE LOCAL MAXIMUM, I.E., MAXIMUM WITHIN THE PROCESSING WINDOW),
THEN
CONTOUR [FRAMECOUNT] = SPEECH_SAMPLE [N/2]
ELSE
CONTOUR [FRAMECOUNT] = 0

FOR (FRAMECOUNT = 2 TO MAXFRAMECOUNT)
        IF (SPEECH_SAMPLE [N/2] IS LOCAL MAXIMUM)
            THEN
            CONTOUR [FRAMECOUNT] = SPEECH_SAMPLE [N/2]
            ELSE
            CONTOUR [FRAMECOUNT] = CONTOUR [FRAMECOUNT - 1]
ENDFOR
```

FIG.3A

SYSTEM AND METHOD FOR DETECTING A RECORDED VOICE

CROSS REFERENCE TO RELATED APPLICATIONS

This application claims priority from Applicants' Provisional Application 60/036,773, filed Jan. 31, 1997, entitled "Recording Device Detection."

BACKGROUND OF THE INVENTION

The invention is directed to a system and method for detecting a recorded voice that can be used to determine whether an individual is employing a recording device in an attempt to defraud an automatic speaker recognition ("ASR") system.

1. Field of the Invention.

The invention relates to the fields of digital speech processing and speaker recognition.

2. Description of Related Art

Voice identification and verification systems, sometimes known as automatic speaker recognition ("ASR") systems, attempt to match the voice of the person whose identity is undergoing identification or verification with the voice of a known user enrolled in the system. ASR systems have, in recent years, become quite reliable in recognizing speech samples generated by enrolled users. Accordingly, ASR systems could potentially be employed in a wide variety of applications.

For example, many banks permit customers to transfer money from their accounts over the phone. A bank normally provides a customer with a numeric password that must be entered via a touch-tone phone before the customer can access his/her account. Should that password be stolen, however, an imposter could gain access to the customer's account. Consequently, banks could add a measure of security by employing an ASR system, wherein a customer's voice must be verified before gaining access to his/her account. ASR systems may also be used, among other things, to: protect personal records; provide physical building security by controlling access to doors; and verify the presence of a convict subject to home detention.

ASR systems can be divided generally into two categories: text-dependent and text-independent. A text-dependent ASR system requires that the user speak a specific password or phrase (the "password") to gain access. This password is determined by the system or by the user during enrollment, and the system generates and stores a "voice print" from samples of the user saying his/her particular password. A voice print is a mathematical model generated from certain of the user's speech characteristics exhibited during enrollment. During each subsequent verification attempt, the user is prompted again to speak the password. The system extracts the same speech characteristics from the verification sample and compares them to the voice print generated during enrollment.

In a text-independent ASR system, the system builds a more general model of a user's voice characteristics during enrollment. This usually requires the user to speak several sentences during enrollment rather than a simple password so as to generate a complete set of phonemes on which the model may be based. Verification in a text-independent system can involve active prompting or passive monitoring. In an active-prompting system the user is prompted to state specific words or phrases that are distinct from the words or phrases spoken during enrollment. Such systems check first to ensure that the prompted words were spoken, and, second, to determine whether an authorized user spoke those words. In a passive-monitoring system, the user is expected to speak conversationally after access, and the system monitors the conversation passively until it can determine whether the user is authorized. In either event, verification usually requires the user to speak eight to ten seconds of speech compared with the one to two seconds required in a text-dependent system.

Despite their potential for wide-spread use, ASR systems have enjoyed only limited application to date. One reason for this is that an imposter can defraud as ASR system by playing a recording of an authorized user's voice. If the recording is of a high enough quality, an ASR system recognizes the recorded voice as that of an authorized user and grants access. A variety of recording devices can be used to defraud ASR systems, including wiretapping and tape recording devices. For example, unauthorized users have bugged public telephones with a tape recording device mounted in the vicinity of the phone booth or in the receiver of the phone. In addition, digital voice or speech files and digital audio tapes of an authorized user can be stolen by an imposter and used to gain unauthorized access to the systems protected by ASR techniques.

Some text-independent systems may inherently avoid this problem. In an active-prompting text-independent system, an imposter will not have advanced notice of the phrase required to be spoken during verification and is, therefore, unlikely to have the proper phrase recorded. Further, in a passive-monitoring text-independent system, the imposter is required to have the entire conversation of an authorized user recorded to gain access.

As discussed, however, text-independent systems have drawbacks that make them ill-suited to many applications. For example, active-prompting text-independent systems can be less user friendly than text-dependent systems. A bank customer is likely to complain of having to speak long phrases to gain access to his/her accounts. In addition, there are many applications in which a user is not be expected to speak at all after access, thus making passive-monitoring text-independent systems less useful.

U.S. Pat. No. 5,548,647, entitled "Fixed Text Speaker Verification Method and Apparatus," issued to Naik et al. on Aug. 20, 1996, provides one method for reducing fraudulent access to a text-dependent system. In the disclosed method, an authorized user enrolls using a number of passwords, such as the numbers one through nine. During verification, the user is prompted to speak a random one or several of the passwords. Without advanced notice of the specific password required for access, an imposter is less likely to have immediate access to the proper recorded password.

Nevertheless, the method taught by Naik has some drawbacks. For example, an imposter who wiretaps an authorized user's phone may eventually be able to collect recordings of each of the randomly prompted passwords and replay the correct password(s) quickly enough during verification to gain access. Moreover, in some settings, an authorized user may purposefully attempt to defraud the ASR system using a recording of his/her own voice. For example, where a convict is subject to home detention, he/she may record all of the random passwords in his/her own voice. Then, when the ASR system calls to ensure that the convict was in his/her home a prescribed time, a cohort could play back the correct password and defraud the system.

What is needed is a reliable system and method to detect the use of a recorded voice over a communications channel.

What is needed is a reliable system and method to prevent fraudulent access to ASR-protected systems using the recorded voice of an authorized user.

SUMMARY OF THE INVENTION

The method and apparatus of the present invention provide significant improvements over the prior art. The present invention employs a variety of techniques that, alone or in combination, provide a reliable system for detecting the use of a recorded voice over a communications channel. Further, the present invention can be employed to improve the ability of both text-dependent and text-independent ASR systems to detect the fraudulent use of a recorded voice. The present invention provides improved performance over the prior art by employing the following techniques and modules alone or in combination to perform the following: (1) analyzing the temporal characteristics of the user's speech; (2) analyzing the characteristics of the channel over which the user's voice is transmitted; (3) training a pattern classifier to recognize the difference between live and recorded speech; and (4) employing an "audio watermark" to detect use of a recording of a previous enrollment or verification attempt.

1. Temporal Characteristics—Summary

Most people cannot naturally repeat a word or phrase exactly the same way. Although the human ear may not be able to hear the difference when an individual repeats a particular word, slight changes in the individual's speech are inevitable. In one embodiment, the claimed invention determines whether certain temporal characteristics of a voice sample captured during a verification attempt match closely with characteristics of a voice sample obtained during an enrollment phase or previous verification attempts. If so, the use of a recording is detected.

For example, each speech sample has a particular "pitch contour" (the change in pitch over time). If the pitch contour matches too closely with the pitch contour from a previously stored verification attempt, the system detects the use of a recording and denies verification. Other characteristics that cannot be repeated naturally and, therefore, may be employed in this embodiment include: loudness contour, zero crossings, duration of actual speech content, and verification score from an ASR system.

2. Channel Detection—Summary

Each communications channel has unique, detectable characteristics. For example, repeated phone calls made between two stationary phones should always exhibit the same channel characteristics, within certain tolerances. By contrast, a call made from a cellular phone exhibits different channel characteristics. If an imposter records an authorized user's voice over a communications channel (e.g., by wiretapping), he/she also records the channel characteristics of that communication. The present invention utilizes channel characteristics to detect use of a recording in several different applications.

First, in an application where the system expects the channel characteristics to be identical for each verification (e.g., home detention system), the present invention detects a potential fraud where the channel characteristics of the current call do not closely match the stored characteristics from enrollment.

Second, in an application where a user is prompted to say several random passwords, the present invention detects a recording when the channel characteristics change significantly from one password to another. This indicates that the passwords were recorded at different times, on different channels.

Finally, in an application where initial password verification is followed by either user speech or user-input touch tones, the present invention detects a recording if the channel characteristics detected during password verification do not match the post-verification channel characteristics. This indicates that an imposter used a recording during password verification.

3. Trained Pattern Classifier—Summary

Another embodiment of the present invention employs a pattern classifier to determine whether a speech sample is live or recorded. Live and recorded speech samples are digitized and converted into a particular format, such as spectral feature vectors. The formatted data is then fed to a pattern classifier, such as a Neural Tree Network ("NTN"), which develops models of live versus recorded speech. The pattern classifier can then be used to make decisions whether a particular speech sample is live or recorded.

4. Audio Watermarking—Summary

"Watermarking" is a technique of imposing a transparent seal of authenticity that cannot be duplicated easily by an imposter. A further embodiment of the present invention stamps an "audio watermark" on each enrollment and verification attempt by an authorized user. For example, in one embodiment a series of DTMF tones is transmitted to the user's telephone immediately after he/she is prompted to speak a password during enrollment and verification attempts. If an enrollment or verification attempt is recorded, the audio watermark is recorded along with the authorized user's voice. An unauthorized user who employs that recording then play back the audio watermark, which is detected, and the unauthorized user is denied verification.

While the different embodiments can be employed independently, they can also be joined either serially or in parallel. With such combinations, the decision whether to deny verification can be made either strictly (e.g., if the user fails under one technique, verification is denied);by majority decision (e.g., the user must fail under a preset number of techniques to deny verification); or by an average of "confidence scores" (e.g., each technique produces a confidence score, and the average of those confidence scores is used to make a decision regarding verification).

Accordingly, it is an object of the present invention to provide a reliable system and method to detect the use of a recorded voice over a communications channel. It is a further object of the present invention to provide a reliable system and method to prevent fraudulent access to ASR-protected systems using the recorded voice of an authorized user.

BRIEF DESCRIPTION OF THE DRAWINGS

FIG. 3A shows pseudo code for generating a contour tracing the positive peaks of a signal such as that shown in FIG. 3.

DESCRIPTION OF THE PREFERRED EMBODIMENT(S)

The present invention can be employed independently to detect the use of a recorded audio signal; however, the present invention is described in terms of preferred embodiments that work in cooperation with an ASR system. In addition, it is recognized that ASR systems can be employed to either identify a user's voice or verify that a particular user is authorized to access a protected system, however, the present invention is described in terms of preferred embodiments that use an ASR system to verify authorized users.

All of the processing necessary for the embodiments of the present invention can be performed by a general purpose computer processing unit ("CPU"). In the preferred embodiment, the computer processing unit for the recording device detection system is an Intel Pentium platform general purpose CPU of at least 100 MHZ having about 10 MB associated RAM memory and a hard or fixed drive as storage. Alternate embodiments could employ the Dialogic Antares card or digital signal processors such as: Texas Instruments' TMS320C family, Analog Devices' ADSP2106x family, or Motorola's DSP96000. In addition, the recording device detection system can be implemented using the same CPU as its associated ASR system.

Figure 1A:
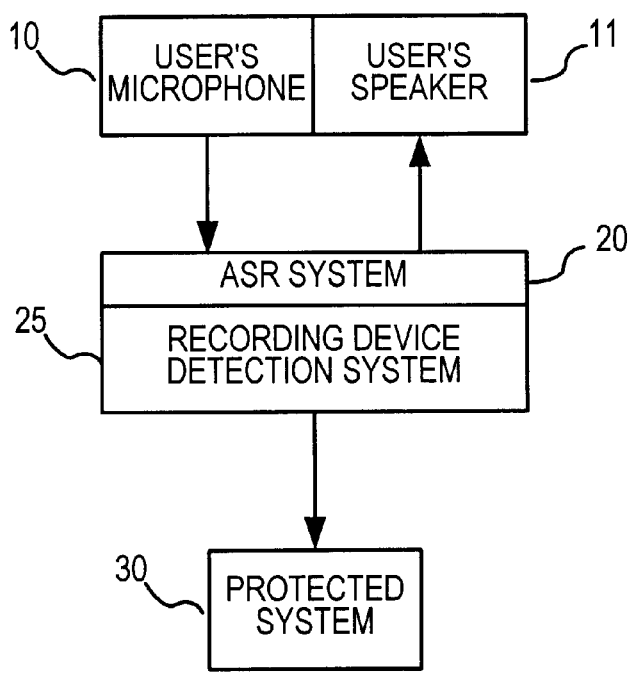
FIG. 1A illustrates the system configuration employed in several embodiments of the present invention.

FIG. 1A depicts a system configuration for several embodiments of the present invention. A user, equipped with a microphone 10 and speaker 11 attempts to access a protected system 30. The user's microphone 10 and speaker 11 could comprise a telephone handset, an intercom system, a personal computer multimedia system, or any other system that allows audio communications to be sent and received. An ASR system 20, with an associated recording device detection system 25, provides a level of security to protected system 30. A preferred ASR system is described in U.S. patent application Ser. No. 08/976,280, "Voice Print System and Method," filed by Manish Sharma, Xiaoyu Zhang, and Richard Mammone, on Nov. 21, 1997, which is herein incorporated by reference in its entirety. Protected system 30 could include computer networks or files, a telephone banking system, a physical entry-control system for a building, or any other system wherein a user could be identified by his/her voice. ASR system 20 and recording device detection system 25 permit access to the protected system 30 only after verification of an authorized user's voice and a determination that the user's voice was not a playback of a recording.

Figure 1B:
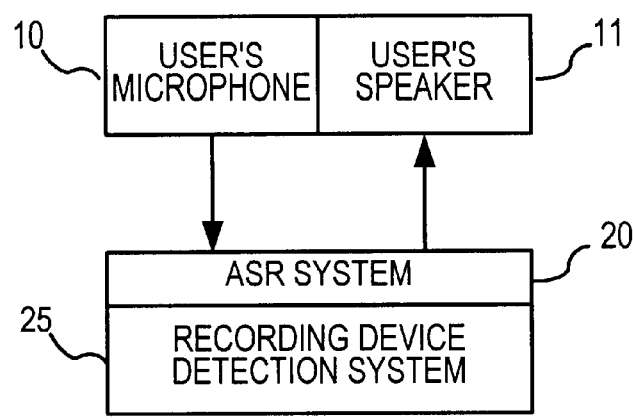
FIG. 1B illustrates the system configuration employed in other embodiments of the present invention.

FIG. 1B depicts the system configuration for other embodiments of the present invention wherein the ASR system 20 and recording device detection system 25 are used to verify that a particular person is presently using microphone/speaker 10, 11. For example, ASR system 20 and recording device detection system 25 can be used to determine whether a convict who is subject to home detention is at home at a prescribed time. ASR system 20 verifies that the convict's voice is received from the telephone 10/11 at his/her home, and recording device detection system 25 verifies that the voice is live and not recorded.

1. Temporal Characteristics—Detailed Description

Figure 2:
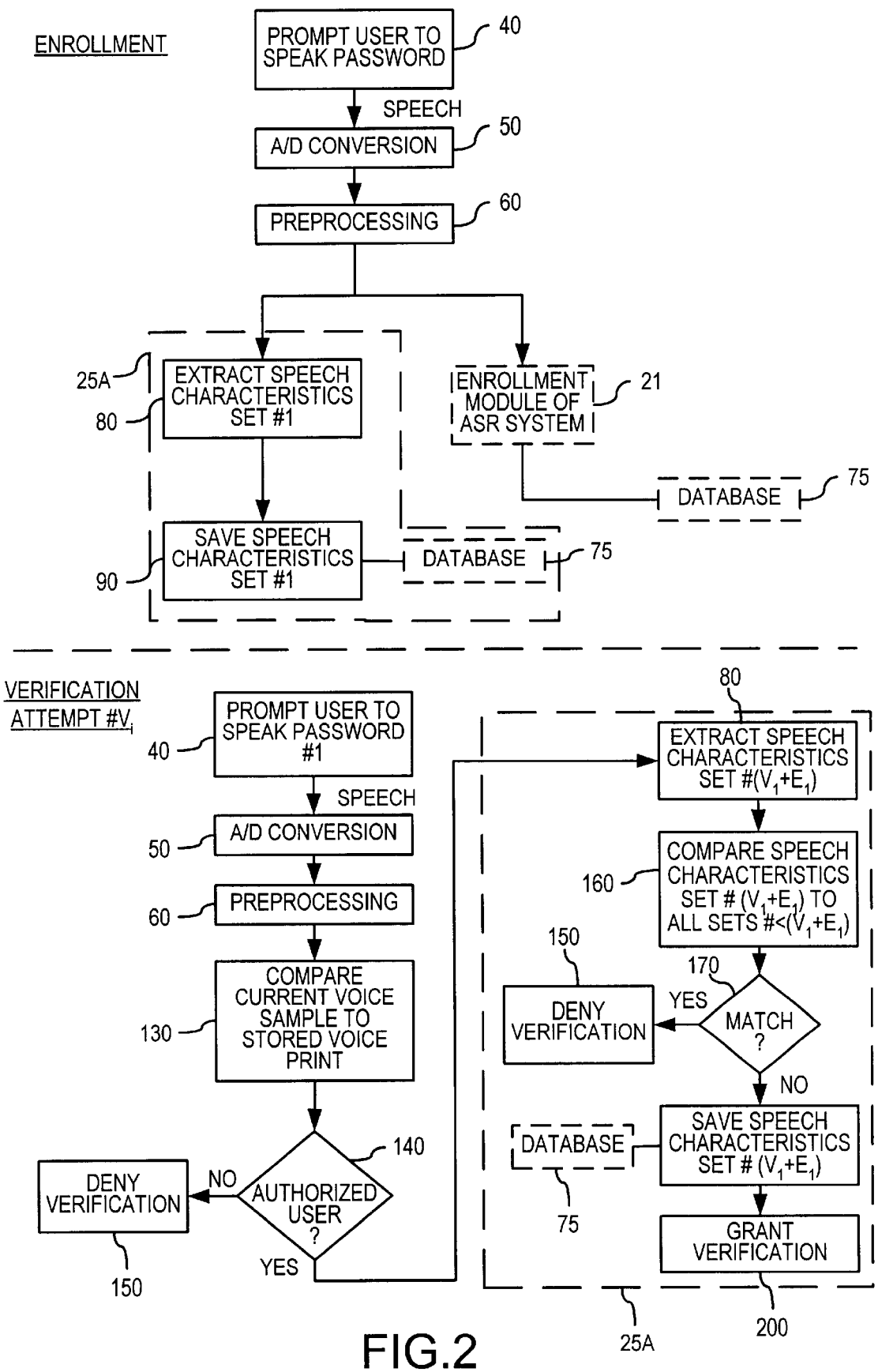
FIG. 2 is a block diagram of one embodiment of the present invention utilizing temporal speech characteristics to detect a recorded voice.

FIG. 2 depicts a preferred embodiment of the present invention employing recording device detection module 25A, which uses the temporal characteristics of speech to detect an unauthorized access attempt. This technique may be employed in either of the system configurations shown in FIGS. 1A and 1B. The embodiment depicted in FIG. 2 includes an enrollment component and a verification component. In all of the embodiments described herein where an enrollment component is employed, the enrollment component uses system prompting to generate and store information relating to an authorized user's voice. That information is then archived and compared to information generated from the sample undergoing verification to determine if it is a recording.

A user is prompted 40 by the ASR system 20 to speak a first password into microphone 10. The password may be system-dictated or chosen by the user. The term "password" as used herein may comprise a single word, a phrase, a sentence, or any audible utterance. The user's speech is then converted 50 from analog to digital, if necessary. Analog-to-digital conversion can be performed with standard telephony boards such as those manufactured by Dialogic. A speech encoding method such as International Telecommunications Union ("ITU") G711 standard $\mu$ and A law can be used to encode the speech samples. A sampling rate of 8,000 Hz is preferred. Alternatively, the speech may be obtained in digital format, such as from an ISDN transmission. In that case, a telephony board is used to handle the Telco signaling protocol.

The digital enrollment speech is then pre-processed 60. Preprocessing 60 may include one or more of the following techniques, as follows:

1. Conversion, if necessary, from nonlinear format, such as $\mu$ law or A law, to a standard integer or floating point representation;

2. DC bias removal to remove DC bias introduced by analog-to-digital hardware or other components. The mean value of the signal is computed over the entire voice sample and then is subtracted from the voice samples;
3. Preemphasis using digital filtering. In this case, a digital filter $H(z)=1-\alpha z^{-1}$ is used, where $\alpha$ is set between 0.9 and 1.0;
4. Band pass filtering to remove low frequency (such as 60 Hz electricity hum) and high frequency noises;
5. Silence removal using energy and zero-crossing statistics. The success of this technique is primarily based on finding a short interval which is guaranteed to be background silence (generally, the few milliseconds at the beginning of the utterance, before the speaker actually starts recording). Thresholds are set using the silence region statistics, in order to discriminate speech and silence frames;
6. Silence removal based on an energy histogram. In this method, a histogram of frame energies is generated. A threshold energy value is determined based on the assumption that the biggest peak in the histogram at the lower energy region shall correspond to the background silence frame energies. This threshold energy value is used to perform speech versus silence discrimination.

In the preferred embodiments, the following preprocessing is conducted: conversion from nonlinear format to standard integer or floating point format, signal mean removal to remove DC bias, signal pre-emphasis using filter $\alpha=0.95$, and silence removal using the energy histogram technique (20 bins in histogram). During silence removal, frame energies are computed using hamming windowed analysis frames, with 30 millisecond analysis frames and 10 millisecond shifts between adjacent frames.

Following preprocessing, the speech sample is sent to the enrollment module 21 of ASR system 20. Preferably, the user enrolls using the same password several times. This allows enrollment module 21 of ASR system 20 to build a statistical model (a voice print) of the user's voice for that password. In other words, the voice print is created by the enrollment module 21 of ASR system 20 by analyzing the deviations in speech characteristics of the user when repeatedly speaking a single password. Specific methods of voice print generation are explained more fully in U.S. patent application Ser. No. 08/976,280, "Voice Print Method and Apparatus," previously incorporated herein by reference.

The voice print created from the user's voice is stored in voice print database 75, where it is indexed to the user and the particular password used. Database 75 may be RAM, ROM, EPROM, EEPROM, hard disk, CD ROM, writeable CD ROM, minidisk, file server, or other storage device. The minimum memory capacity of the database is determined by the number of users of the system and voice prints stored.

Referring to the enrollment component of FIG. 2, a first set of temporal speech characteristics, such as loudness contour, pitch contour, zero crossing contour, and the duration of actual speech content, are extracted 80 for each speech sample produced by the user. The technique for extraction varies depending on the feature. For example, the duration of actual speech content is a scalar value that can be measured directly after removal of background silence and pauses, which is preferably done during preprocessing.

Figure 3:
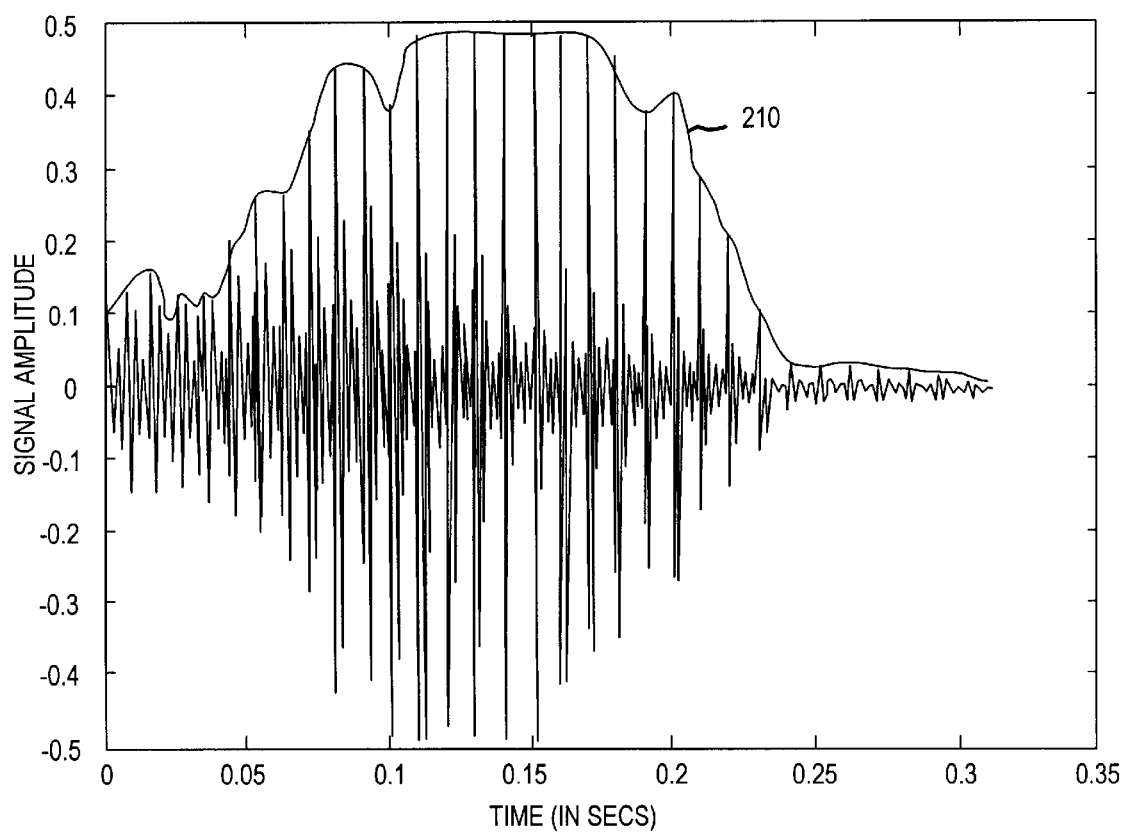
FIG. 3 shows a diagram of a speech sample, useful for describing the speech characteristics utilized by the embodiment set forth in FIG. 2.

"Loudness contour" is more difficult to determine. FIG. 3 depicts approximately 0.3 seconds of a speech sample. A loudness contour 210 for this portion of speech is a curve that follows a trajectory similar to that traced by the signal amplitude peaks over time. Digitally, this can be estimated by analyzing the speech wave form in a short time window called a "processing frame." It is preferred that the processing frame cover about 30 milliseconds. Adjacent frames are overlapped by about 20 milliseconds to ensure a smooth transition from frame to frame.

Within each frame, the signal energy present in the waveform may be computed by any of the following techniques:

1. Average mean square value:

$$E_k = 1/N * \sum_{i=1}^{i=N} s_i^2$$

where N is the total number of samples in the processing frame, s is the value of the signal, k is the frame number of the sliding processing frame over the speech signal, and i is the sample number within a processing frame.

2. Logarithm of the average energy obtained above:

$$L_k = \log_{10}(E_k)$$

3. Average signal magnitude:

$$M_k = 1/N * \sum_{i=1}^{i=N} |s_i|$$

where $|\ |$ represents the absolute value of the number.

It is preferred that the average mean square method be used to determine the signal energy in each processing frame. The loudness contour characteristic 210 is then estimated by storing the signal energy values for every frame as elements in a vector. The signal energy values are then plotted against a time axis to produce a contour 210 representing the loudness of the user's voice over the course of his/her speech.

Alternatively, loudness contour can be derived directly from the speech sample data by tracing the positive portion of the speech signal. This can be accomplished according to the pseudo-code illustrated in FIG. 3A. Variables are initialized 212 and the speech sample is analyzed 214 with a sliding processing frame, which finds the local peaks in the speech data and traces the contour 210 illustrated in FIG. 3. A similar contour can be obtained by tracing the negative portion of the speech signal. In that event, the positive contour and negative contour may be used independently or in combination to create a two-dimensional contour.

Pitch contour is determined similarly. Speech is generated by the vibration of the vocal cords, and pitch refers to the fundamental frequency of that vibration. Pitch produces a periodicity in the speech signal, and it is the main acoustic cue used to represent intonation and stress in speech. Pitch can be determined either from periodicity in the time domain or from regularly spaced harmonics in the frequency domain.

The average pitch value is estimated for each processing frame. Several methods have been developed for obtaining a pitch estimate. Several such methods are described in W. Hess, "Pitch Determination of Speech Signals: Algorithms and Devices," Springer-Verlag, Berlin, 1983. The preferred method is described by R. P. Ramachandran and P. Kabal in "Pitch prediction filters in speech coding," IEEE Transactions on Acoustic, Speech and Signal Processing. vol. ASSP-37, 1989, pg. 467–78, which is hereby incorporated by reference. Once the average pitch value has been determined for each processing frame, the values are again saved as elements of a vector and plotted against a time axis to produce a pitch contour.

Similarly, a zero crossing rate measurement can be used as a comparison characteristic in this embodiment. As can be seen in FIG. 3, "zero crossing" occurs each time the voice print waveform crosses the time axis (i.e., changes algebraic sign). A zero crossing rate measurement can be mathematically defined as:

$$T_k = 1/N * 0.5 |\text{sign}(s_i) - (s_{i-1})|$$

where T is the zero-crossing metric, and "sign" is an arithmetic sign operator. For example, sign(s)=1 if s is greater than or equal to zero and−1 if s is less than zero. The zero crossing rate measurement for each processing frame is again stored as an element in a vector, and the values are plotted against a time axis to create a contour.

It is preferred that the temporal characteristics are extracted individually. However, each of the characteristics that is derived within a processing frame (e.g., loudness contour, pitch contour, etc.), can be extracted as part of a multi-dimensional vector of characteristics corresponding to that processing frame. This technique produces a multi-dimensional contour as opposed to multiple single-dimensional contours produced when the characteristics are extracted independently. If a multi-dimensional contour is produced, it is important that the characteristic elements of each vector are normalized according to their standard deviations in order to avoid bias from elements having large values.

A simple average of pitch or loudness or zero-crossings over the course of a voice sample can also be used as a characteristic under this method. However, it is preferred that the contour of those characteristics be used as they provide more accurate and unique representation of the user's speech. In addition, it is appreciated that other characteristics can be employed for a more rigorous comparison. For example, speech auto-correlation coefficients or other spectral feature vectors of speech can be employed.

After extracting the desired temporal speech characteristics, they are stored 90. As will be recognized by those skilled in the art, the temporal speech characteristics may be stored in a separate file or database record. It is preferred, however, that the characteristics be stored in database 75 and indexed to the voice print stored there and the particular password used during that enrollment stage. Again, the memory architecture used may be a flat file or a data record in a commercial or proprietary database or any other storage means.

Importantly, although only one voice print is stored for each password of a particular user, it is preferred that a temporal characteristics set is generated and stored for each utterance of a password. In other words, to generate a single voice print, the user may be prompted to speak a single password four different times. Preferably, four temporal characteristics sets are then generated and stored for that password and voice print.

Alternatively, the temporal characteristics sets for each password may be averaged and stored. Because the characteristics sets corresponding to multiple utterances of a password may not be of the same length, standard averaging techniques cannot be used. It is necessary to normalize the time-length of the characteristics contours before averaging can be performed. Dynamic time warping ("DTW") is one technique that permits such normalization of time-length. The procedure of averaging patterns of varying lengths using DTW is explained in detail in U.S. patent application Ser. No. 08/976,280, "Voice Print System and Method," which has previously been herein incorporated by reference. The DTW algorithm is explained in H. Sakoe and S. Chiba, "Dynamic Programming Algorithm Optimization for Spoken Word Recognition," IEEE Transactions on Acoutics, Speech and Signal Processing, vol. ASSP-26, Nov. 1, 1978 and, C. Myers, L. R. Rabiner and E. E. Rosenberg, "Performance Tradeoffs in Dymanic Time Warping Algorithms for Isolated Word Recognition", IEEE Transactions on Acoutics, Speech and Signal Processing, vol. ASSP-28, Nov. 6, 1980, which are also herein incorporated by reference.

In the preferred embodiment, the ASR system then prompts the user to speak a second password, and the enrollment process is restarted. This causes a second voice print to be stored along with the temporal characteristics sets of each of the voice samples used to generate the voice print. Preferably the user enrolls using several passwords, creating a voice print and temporal characteristics sets for each one. This is true for all embodiments described herein where an enrollment component is employed.

After enrollment, the system is prepared for verification attempts by the user. The verification component of the present invention begins by prompting 40 the user to speak a password. In the preferred embodiment the user is prompted randomly to speak one of the several passwords he/she used to enroll in the system. FIG. 2 depicts verification attempt $V_1$ by the user, where $V_1$ is an integer that is increased by one after each successful verification attempt by a user speaking his/her first enrolled password. The user's speech is again translated, if necessary, from analog: to digital 50 and preprocessed 60 according to any of the techniques previously described with respect to enrollment. After preprocessing, the current voice sample is compared 130 to the voice print stored for that password during enrollment. This comparison is made in accordance with the particular ASR system 20 employed.

A decision is then made 140 by the ASR system 20 whether the current sample matches the voice print closely enough to verify that an authorized user's voice has been detected. If not, verification is denied 150. Depending on the application, a denial of verification 150 can have different consequences. If used in the system configuration of FIG. 1A, the user is denied access to the protected system 30. By contrast, the system may simply detect a violation in a home detention setting such as the system configuration of FIG. 1B. In other applications, the user could be given a "second chance" to obtain verification.

If an authorized user's voice is verified, the temporal speech characteristics are extracted 80 from the current sample to create characteristics set number ($V_1+E_1$), where $E_1$ is the number of repetitions by the user of his/her first password during enrollment. As previously noted, a temporal speech characteristics set is created during enrollment for each utterance of a particular password, whereas only one voice print is created for each password.

The temporal characteristics set number ($V_1+E_1$) is then compared 160 to all characteristics sets number ($<(V_1+E_1)$) that are indexed to the first password. In other words, the current characteristics set is compared to the ($V_1+E_1-1$) characteristics sets that were derived during the $E_1$ enrollment phases and the ($V_1-1$) successful previous verification attempts for the user's first password. For example, if a user enrolled four times using his first password and was currently attempting to be verified using his first password for the seventh time, then $E_1=4$; $V_1=7$. The set of characteristics extracted from the current sample is then compared to the previous 10 (7+4−1) characteristics sets.

Characteristics that have been derived as scalar quantities, such as speech content duration, can be compared directly. However, a speech characteristic derived as a vector, a track, or a contour might not be amenable to direct comparison. The duration of speech from one utterance to another may vary due to the speaker's mood, stress, and intonation, or background noise. This results in a different number of processing frames even for identical passwords. Consequently, the length of tracks or contours of the speech characteristics for a certain password may vary.

It is necessary to normalize the time-length of the characteristics contours to make a proper comparison. DTW, which has been previously discussed, permits such normalization of time-length and comparison. DTW normalizes the time-length differences of two contours before computing a distortion metric between them. The level of distortion metric determines the extent of the match between the contours. DTW is explained at length in U.S. patent application Ser. No. 08/976,280, "Voice Print System and Method," which has previously been herein incorporated by reference. Alternatively, linear mapping between the time-lengths of two contours can be used for time-length normalization and comparison.

It is preferred that all temporal characteristics (e.g., pitch contour, loudness contour, etc.) are compared to stored values before making a decision 170 as to the use of a recording. In the preferred embodiment, an overall match between characteristics sets is detected only if the majority of characteristics employed match within certain tolerances. As discussed, humans are not expected to be able to repeat temporal characteristics of speech with significant precision. Accordingly, a close match between current and previous speech characteristics sets indicates the use of a recording device. In addition to temporal characteristics, the "verification score" produced by ASR system 20 can be used as another test characteristic because, ordinarily, the score is not expected to remain constant on successive verification attempts. It is preferred that it the verification score is not to be used as a comparative characteristic, the comparison of temporal speech characteristics precede the comparison of the current sample to the stored voice print by ASR system 20.

It is preferred that the tolerance for a match of each characteristic is set separately for each password. Tolerances are preferably set during enrollment. DTW comparison is made between all possible pair combinations of characteristics sets extracted from the multiple enrollment utterances for a particular password. The mean and standard deviations of the DTW scores for each characteristic are calculated for that password. A threshold is then set for each characteristic based on the standard deviation of the DTW score for that characteristic. Alternatively, the maximum DTW distortion metric calculated during the enrollment pair comparisons can be used as a threshold. The precise threshold (e.g., one standard deviation, maximum DTW distortion metric, etc.) depends on the level of security needed and for a particular application and the user's willingness to tolerate false detection of a recorded voice. One skilled in the art will recognize that various other methods for setting tolerances can he employed, including trial and error and empirically derived tolerances.

If an overall characteristics match is detected, verification is denied 150. Alternatively, speech characteristics set ($V_1$+ $E_1$) may be stored before verification is denied 150 to permit detection of the same recording in the future. If no recording is detected, speech characteristics set ($V_1$+$E_1$) is stored 190 and indexed to the enrollment voice print for that password along with stored characteristics from previous enrollment phases and successful verification attempts. In addition, verification is granted 200. In the system configuration of FIG. 1A, a verification grant 200 permits the user to gain access to the protected system 30. Alternatively, the user receives system confirmation of his/her identity in the system configuration in the embodiment depicted in FIG. 1B.

As the user makes more verification attempts, the database of speech characteristics sets grows for particular passwords. Preferably, the database 75 stores the temporal speech characteristics for at least the last ten verification attempts by the user for a particular password. In this way, if an imposter recently recorded an authorized user's verification attempt, use of that recording is detected. Preferably, the enrollment utterances for a particular password are never replaced. The number of verification attempts for which information is stored varies depending on system memory capacity and the frequency of system use by the user.

2. Channel Detection—Detailed Description

Figure 4:
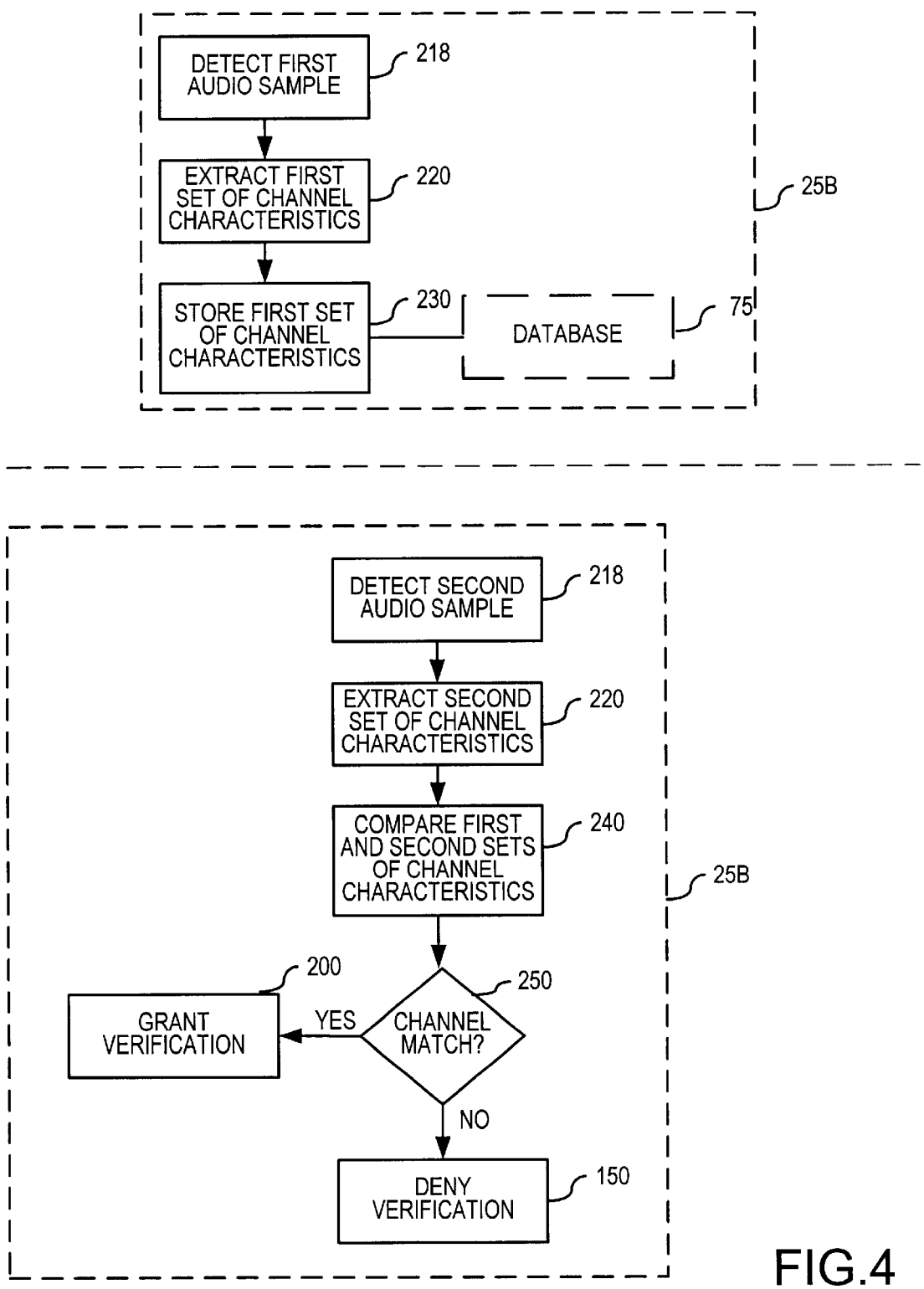
FIG. 4 is a block diagram of one embodiment of the present invention utilizing channel characteristics to detect a recorded voice.

FIG. 4 depicts the general operation of another embodiment of the present invention employing recording device detection module 25B, which uses channel characteristics to detect whether an audio sample is a recording. A first audio sample is detected 218. The audio sample can be comprised of any audio signal. For example, tones produced by the user of a touch-tone phone are sufficient; however, a speech signal is preferred. Next, the unique characteristics of the channel on which the first audio sample was detected are extracted 220 from the sample. Generally, to extract the channel characteristics or "estimate the channel," the distortion present on the channel is analyzed.

It is preferred that the channel characteristics be extracted as follows using the concepts of homomorphic deconvolution. An audio signal with frequency spectrum $S(\omega)$ is distorted by a transmission channel with frequency response $X(\omega)$. The frequency spectrum of the distorted speech $\hat{S}(\omega)$ is given as:

$$\hat{S}(\omega) = S(\omega) \times (\omega)$$

If the logarithm and inverse Fourier transform ($\mathfrak{I}^{-1}$) of the magnitude of both sides of the equation are taken, the following equation results:

$$\mathfrak{I}^{-1} \log(|\hat{S}(\omega)|) = \mathfrak{I}^{-1} \log(|S(\omega)|) + \mathfrak{I}^{-1} \log(|X(\omega)|).$$

Then, the preceding equation can be equivalently represented in cepstral domain:

$$\hat{c}(n) = c(n) + x(n)$$

because cepstrum is defined as the inverse Fourier transform of the logarithm of short-time spectral magnitude. Time invariant convolution distortion $X(\omega)$ can be estimated by averaging the cepstral vectors in the cepstral domain. The channel estimate of $X(\omega)$ in the cepstral domain is equivalent to the mean of $\hat{c}(n)$ assuming that the mean of the speech portion of the cepstral equation $c(n)$ goes to zero.

However, in practice, the cepstral mean may include information other than the estimate of the time-invariant convolutional distortion, such as coarse spectral distribution ol the speech itself. Pole filtering attempts to decouple the speech information from the channel information in the cepstral mean. Since cepstrum can be evaluated as the weighted combination of linear prediction ("LP") poles or spectral components, the effect of individual components on the cepstral mean was examined. It was found that broad bandwidth components exhibited smoother frequency characteristics corresponding to the "roll-off" of channel distortion, assuming that narrow bandwidth components in the inverse filter were influenced more by speech characteristics. Thus, the narrow bandwidth LP poles were selectively deflated by broadening their bandwidth and keeping their frequency the same. Therefore, for every frame of speech, the pole filtered cepstral coefficients ("PFCC") are computed along with LP-derived cepstral coefficients ("LPCC"). A detailed explanation of pole filtering is provided in: D. K. Naik and R. J. Mammone, "Channel Normalization Using Pole Filtered Cepstral Mean Subtraction," Proceedings of SPIE, Vol. 2277, 1994, which is herein incorporated by reference.

Figure 5:
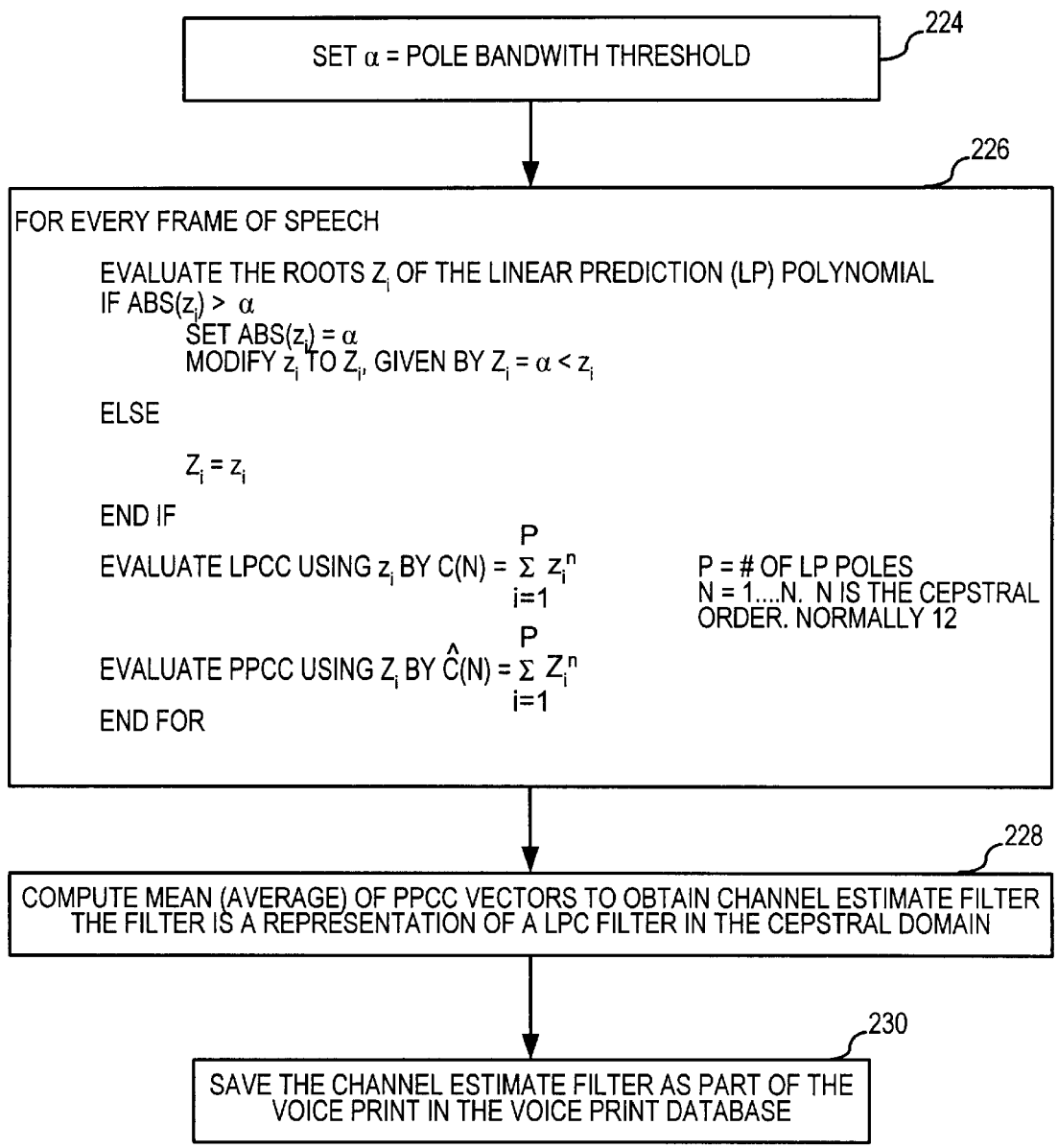
FIG. 5 is pseudo-code for creating a filter to extract the channel characteristics as shown in FIGS. 4, 4A, 4B, and 4C.

To estimate channel characteristics using pole filtered cepstrum, the procedure outlined in the flow chart of FIG. 5 is preferred. With reference to FIG. 5, the first block of pseudo-code 224 sets the pole bandwidth threshold. Next LP-poles $z_i$ and corresponding filtered poles $Z_i$ are obtained and LPCC and PFCC are evaluated 226. This allows the mean of the PFCC vectors to be computed 228, which may be saved 230 as a first set of channel characteristics in the database 75. The PFCC mean may be used to create an LPC filter.

Referring back to FIG. 4, a second audio sample is detected 218 after the extraction and storage of the first set of channel characteristics. A second set of channel characteristics is then extracted 220 from the second audio sample as detailed above. The first and second sets of channel characteristics are then compared 240. Because the channel characteristics are preferably derived in the cepstral domain, they are also preferably compared in that domain. Comparison between two vectors x and y in the cepstral domain can be accomplished with standard vector norms, such as the L2 norm or L1 norm. The L2 norm is the root mean square value of the difference in vector elements:

$$\mathrm{sqrt}\left(\sum_{i=1}^{i=N}(x_i - y_i)^2\right) \text{ where } N = \text{vector length.}$$

The L1 norm is the sum of absolute differences in vector elements:

$$\sum_{i=1}^{i=N}(|x_i - y_i|) \text{ where } N = \text{vector length.}$$

If the first and second sets of channel characteristics match 250 within a preset tolerance, the system grants verification 200. The tolerance for all channel characteristics embodiments may be set empirically based on trial and error, the conditions of the channel, the hardware employed, the level of security desired, and the users' willingness to tolerate false denials of verification. If the two channel characteristics sets do not sufficiently match, the system denies verification 150.

Figure 4A:
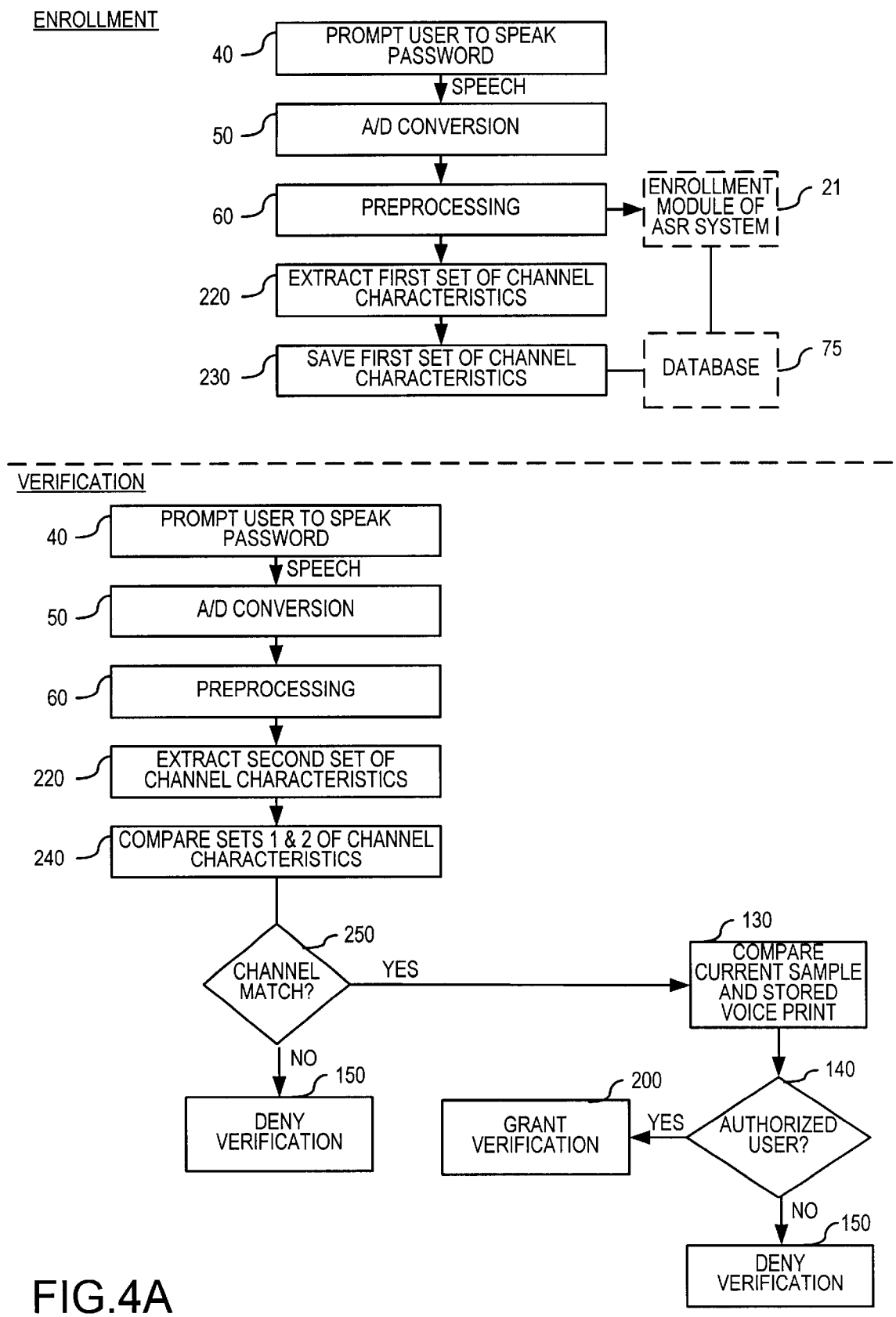
FIG. 4A is a block diagram of a preferred embodiment of the present invention utilizing channel characteristics to detect a recorded voice where the channel characteristics are not expected to change between enrollment and verification.

FIG. 4A illustrates a more specific embodiment of the present invention wherein channel characteristics are used in conjunction with an ASR system 20 to detect whether a particular user has transmitted live speech over a known communications channel. This embodiment is well-suited for use in a home-detention setting or any application where the use of the same phone is expected for enrollment and verification attempts. Again, an enrollment component and a verification component are utilized.

The enrollment component begins with a user being prompted 40 to speak a particular password. The user's response is converted 50 from analog to digital, if necessary. The digitized signal is then preprocessed 60 as previously explained. The voice sample is transmitted to the enrollment module 21 of ASR system 20. If, as preferred, the user enrolls repeatedly with each password, enrollment module 21 of ASR system 20 generates a voice print for that password and stores it in database 75.

In parallel, a first set of channel characteristics representing the channel over which the user transmitted his/her voice is extracted 220 for each utterance of a particular password, preferably as explained above. Unlike the embodiment described in relation to FIG. 2, it is preferred that the cepstral vectors representing the channel characteristics derived for each utterance of a particular password be averaged and that only the average be stored 230 in database 75. In other words, only one set of channel characteristics is stored for each password. Again, database 75 can comprise any storage means, and the channel characteristics can be stored in a separate storage means than the voice print. Preferably, however, they are stored in the same database and indexed to each other, the user, and the password.

The verification component of this embodiment begins with the ASR system 20 prompting 40 the user to speak a password. It is preferred that several passwords be processed during the enrollment phase and that prompting during the verification phase be random. The user's response is then converted 50 from analog to digital, if necessary, and preprocessed 60. A second set of channel characteristics is then extracted 220 from the current digitized sample. The second set of channel characteristics is then compared 240 to the first set stored in database 75 and indexed to the current password. If the system determines 250 that the two sets of characteristics do not match within a preset tolerance, verification is denied 150.

If a match is determined, the ASR system 20 is signaled to compare 130 the current sample to the stored voice print for that password. If ASR system 20 determines 140 that the sample matches the voice print, verification is granted 200. Otherwise, verification is denied 150.

In a home detention application, enrollment is performed using the confined person's home phone. A denial of verification then indicates that a recorded voice was used for verification or that the confined person was transmitting from a different phone than used during enrollment (e.g., his/her home phone was forwarded to another location). Upon denial of verification, the system could be equipped with a modem and automatically notify the proper governmental authority of the violation.

Figure 4B:
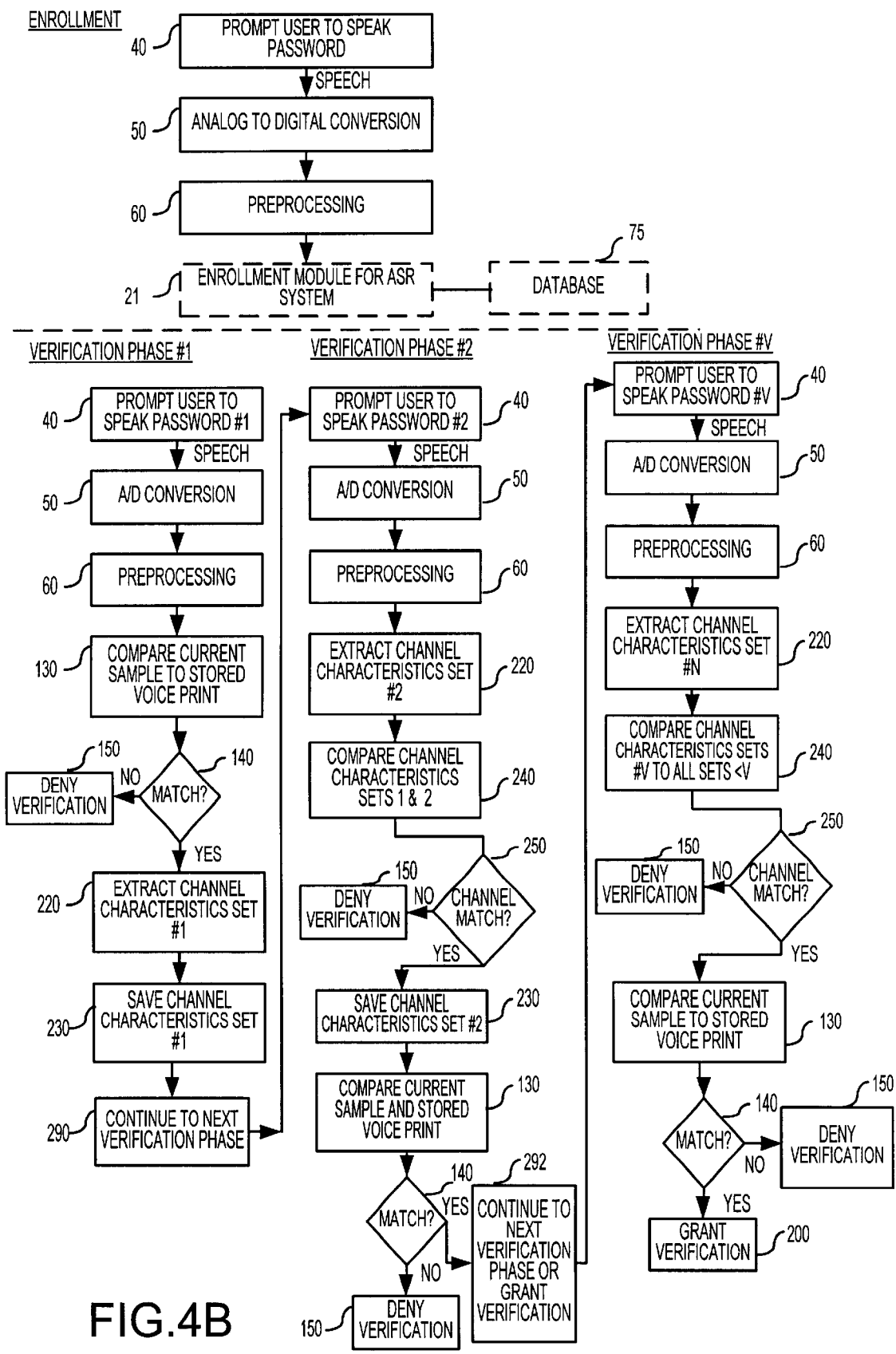
FIG. 4B is a block diagram of a preferred embodiment of the present invention utilizing channel characteristics to detect a recorded voice where a user is prompted to speak multiple passwords during a single verification session.

FIG. 4B illustrates another preferred embodiment of the present invention adapted for use with an ASR system 20 that grants verification only after analysis of several password samples. Unlike the embodiment illustrated in FIG. 4A, this embodiment is adaptable to an application where the user is not confined to using the same microphone 10 and speaker 11 during enrollment and verification attempts. This embodiment employs an enrollment component and a verification component with at least two phases. Enrollment begins with the ASR System 20, prompting the user to speak a password. The user's response is converted 50 from analog to digital, if necessary. The digitized signal is then preprocessed 60 as previously explained. The sample is then transmitted to the enrollment module 21 of ASR system 20. After the user provides several voice samples for a particular password, the enrollment module 21 of ASR system 20 creates a voice print for that password and stores it in database 75.

The first verification phase of this embodiment begins with the ASR system 20 prompting the user to speak a first password. It is required in this embodiment that several passwords be processed during the enrollment phase and preferred that prompting during the verification component be random. The user's response is then converted 50 from analog to digital, if necessary, and preprocessed 60. The ASR system 20 then compares 130 the current sample to the voice print stored for the current password during enrollment. The ASR system 20 decides 140 whether the sample matches the voice print within a preset threshold. If the sample does not match the voice print, verification is denied 150.

If a match is found, channel characteristics for the current voice sample are extracted 220 as described in previous embodiments. This first set of channel characteristics is then stored 213 in database 75, and the user is then permitted 290 to continue to the next verification phase. In this embodiment, the channel characteristics need only be stored 230 in temporary memory, such as a RAM, as the relevant comparisons between channel characteristics are made within the same verification attempt.

The second verification phase begins with ASR system 20 prompting the user 300 for a second randomly selected password. Again, the user's response is converted from analog to digital 50 and preprocessed 60. A second set of channel characteristics is then created by extracting 220 the channel characteristics from the current sample. This second set of channel characteristics is compared 240 to the first set of channel characteristics obtained during the first verification phase. Different channel characteristics detected during one verification phase compared to another indicates that the user has recorded the passwords at different times, on different channels. Therefore, if the two sets of channel characteristics do not match 250 within a preset threshold, verification is denied 150.

If the two sets of channel characteristics closely match, the second set of channel characteristics is saved 230 in database 75. The ASR system is signaled to compare 130 the current sample to the voice print created during enrollment for the current password. If the ASR system determines 140 that the sample does not match the voice print, verification is denied 150. If the sample and the voice print match, the user is permitted to continue to the next verification phase. Alternatively, if the ASR system employs only two verification phases, verification is granted 292. The number of verification phases varies based on the characteristics of the ASR system employed and the level of security desired.

FIG. 4B illustrates an embodiment employing V verification phases. In the Vth and last verification stage, the user is prompted to speak a Vth randomly selected password. The user's response is converted from analog to digital 50 and preprocessed 60. A Vth set of channel characteristics is then created by extracting 220 the channel characteristics from the current sample. This Vth set of channel characteristics is then compared 240 to all previously stored sets of channel characteristics obtained during earlier verification phases during the current verification attempt. If the Vth set of channel characteristics does not match 250 all of the previously stored sets within a preset threshold, verification is denied 150.

If the Vth set of channel characteristics closely match all previously saved sets, ASR system 20 is signaled to compare 130 the current voice sample to the voice print created during enrollment for the current password. If ASR system 20 determines 140 that the sample does not match the voice print, verification is denied 150. If a voice print match is detected, verification is granted 200.

Figure 4C:
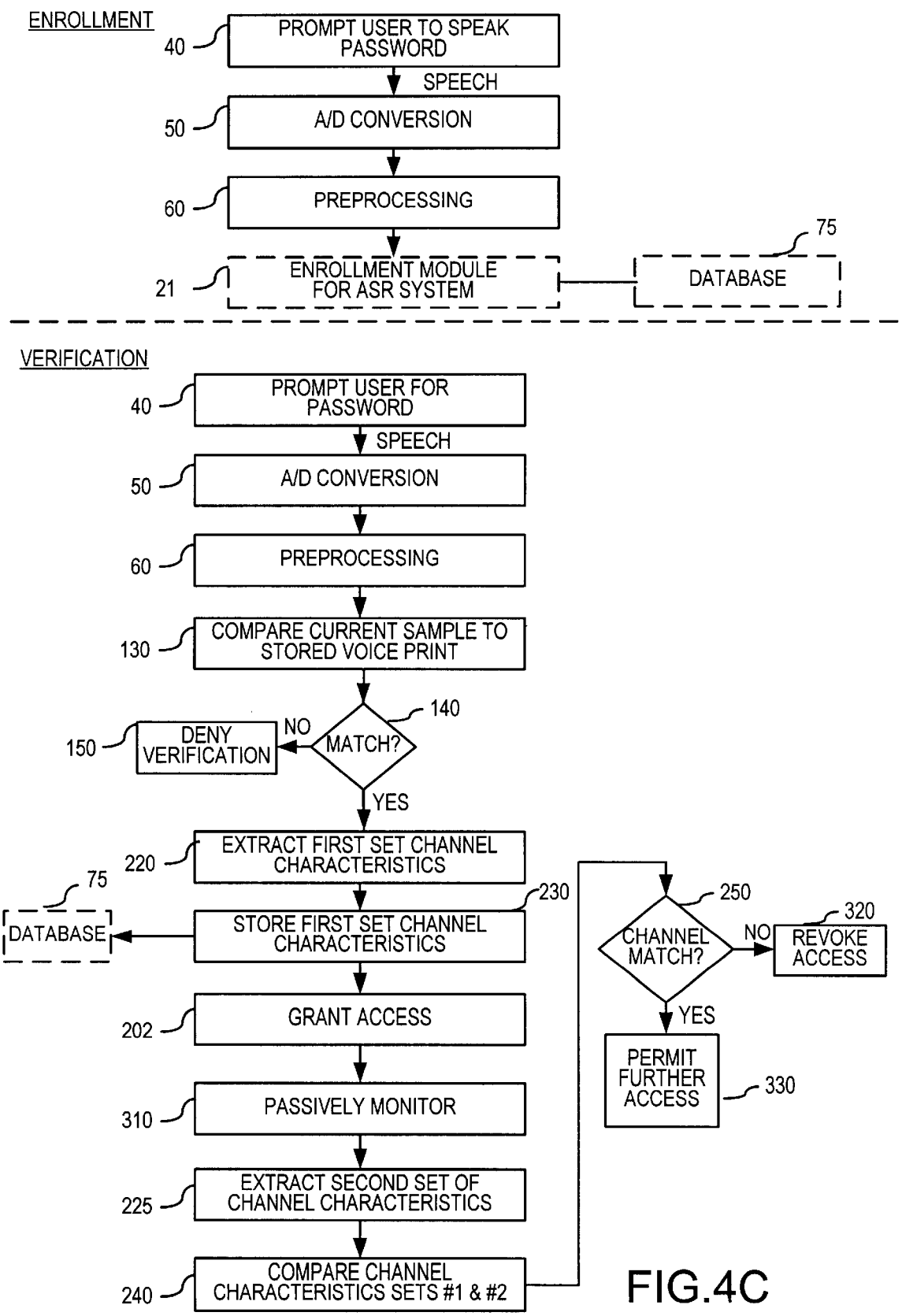
FIG. 4C is a block diagram of a preferred embodiment of the present invention utilizing channel characteristics to detect a recorded voice where a user is prompted to speak a first password and is expected to engage in additional communication following password verification.

FIG. 4C illustrates another preferred embodiment of the present invention. This embodiment is adapted for applications using the system configuration in FIG. 1A, where a user is expected to have some communication with a protected system 30 after an initial password verification. For example, this embodiment might be useful in a telephone banking application where a user's voice is first verified using a password. After obtaining access to the banking system, the user may be prompted to speak words or phrases not used during enrollment or to send "touch-tones" from his/her phone. This embodiment monitors the communications channel to determine if the channel characteristics change after the user's voice is password-verified. If a change in channel characteristics occurs, it is assumed that the user employed a recording during password verification, and access to the protected system 30 is revoked.

The enrollment component of this embodiment is identical to that illustrated and explained in relation to FIG. 4B. The verification component of this embodiment begins with the ASR system 20 prompting 40 the user to speak a password. The user's response is converted 50 from analog to digital and preprocessed 60 as previously explained. The ASR system 20 then compares 130 the current sample to the stored voice print for the current password. If the ASR system decides 140 that the sample does not match the voice print, verification is denied 150. If a match is determined, a first set of channel characteristics is extracted 220 from the password sample. This first set of channel characteristics is then stored 230 in database 75. The user is then granted access 202 to use the protected system 30.

The present invention then passively monitors 310 the user's communication with the protected system 30. The user's communication with protected system 30 could take the form of conversational speech, speech in response to prompting, touch-tones from the user's phone, or any audible communication of sufficient length and character to allow the determination and extraction of channel characteristics.

A second set of channel characteristics is then extracted 225 from the user's communication with the protected system 30 after initial password verification. If the user's communication with the protected system 30 after initial verification consists of speech, the previously described method for channel-characteristics extraction is preferred. However, if the user's communication with the protected system takes the form of touch-tones from his/her phone, a different method is preferred. It is preferred that a Fast Fourier Transform be performed on each touch-tone. This produces a frequency response of the channel at two frequency points for each touch-tone. An ensemble of touch-tones at various frequencies is then be used to determine the overall channel characteristics.

Channel characteristics can be affected by differences in the audio signal being transmitted via the channel. It is, therefore, more difficult to compare channel characteristics sets when they are derived from distinct audio samples. The effect of those differences decreases, however, as the time-period of the audio signal used to detect the channel characteristics increases. Accordingly, it is preferred that at least ten seconds of speech be analyzed to derive the second set of channel characteristics. Alternatively, it is preferred that touch-tones representing a wide frequency spectrum be analyzed.

The second set of channel characteristics is then compared 240 with the first set of channel characteristics. If it is determined 250 that the channel characteristics do not closely match, access to the protected system is revoked 320. If a match is determined, the user is permitted to continue his/her access to the protected system 330.

3. Trained Pattern Classifier—Detailed Description

Figure 6:
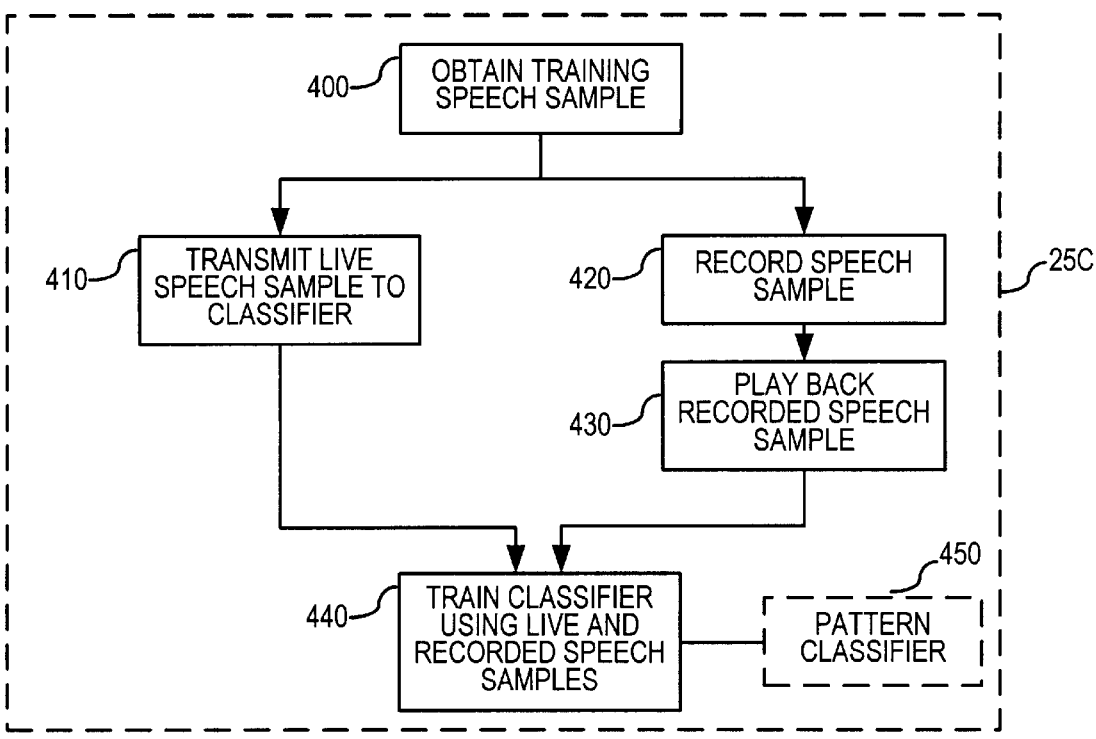
FIG. 6 is a block diagram of an embodiment of the present invention utilizing a trained classifier to distinguish between live and recorded voice samples.
Figure 6:
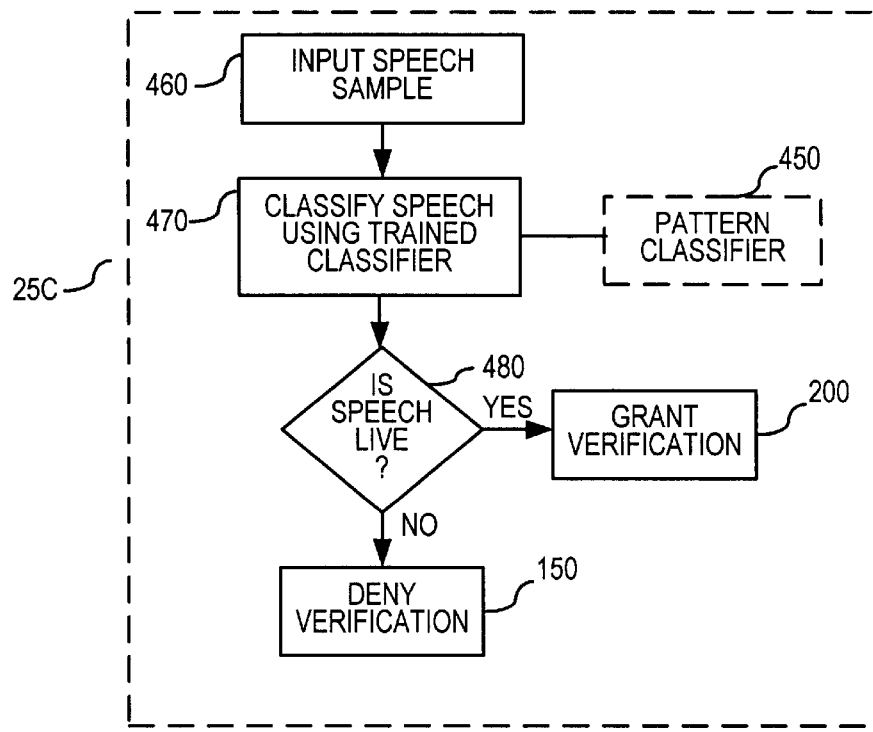

FIG. 6 illustrates the general operation of another embodiment of the present invention employing recording device detection module 25C, which uses a pattern classifier to distinguish between "live" and recorded speech. In this embodiment a pattern classifier is trained with live and recorded speech samples and then used for verification.

The training component begins by obtaining 400 a training speech sample. Preferably, this is accomplished by a person speaking a phonetically rich word, phrase or sentence. Alternatively, speech samples from users enrolling in an associated ASR system could be employed. The live speech sample is then transmitted to the pattern classifier 450. The speech sample is also transmitted to at least one recording device, where it is recorded 420, and played back 430. The replayed sample is also transmitted to pattern classifier 450.

The live and recorded speech samples are then used to train 440 pattern classifier 450. Generally, a pattern classifier is trained by using exemplar data from various types of known data classes. In the present invention, the relevant data classes are (1) live speech and (2) recorded speech, with each sample input to pattern classifier 450 during training denoted as live or recorded. Preferably, the training component is repeated extensively to provide a variety of samples to pattern classifier 450 using different speakers, words, conditions, etc. The pattern classifier is then able to "learn" all of the salient characteristics of the data classes and generalize distinctions between data classes.

Verification begins with a speech sample being input 460 into pattern classifier 450, which has been previously trained as explained above. Based on its training, pattern classifier 450 classifies 470 the current speech sample. If pattern classifier 450 decides 480 that the speech is live, verification is granted 200. If the sample is classified as recorded, verification is denied 150.

Figure 6A:
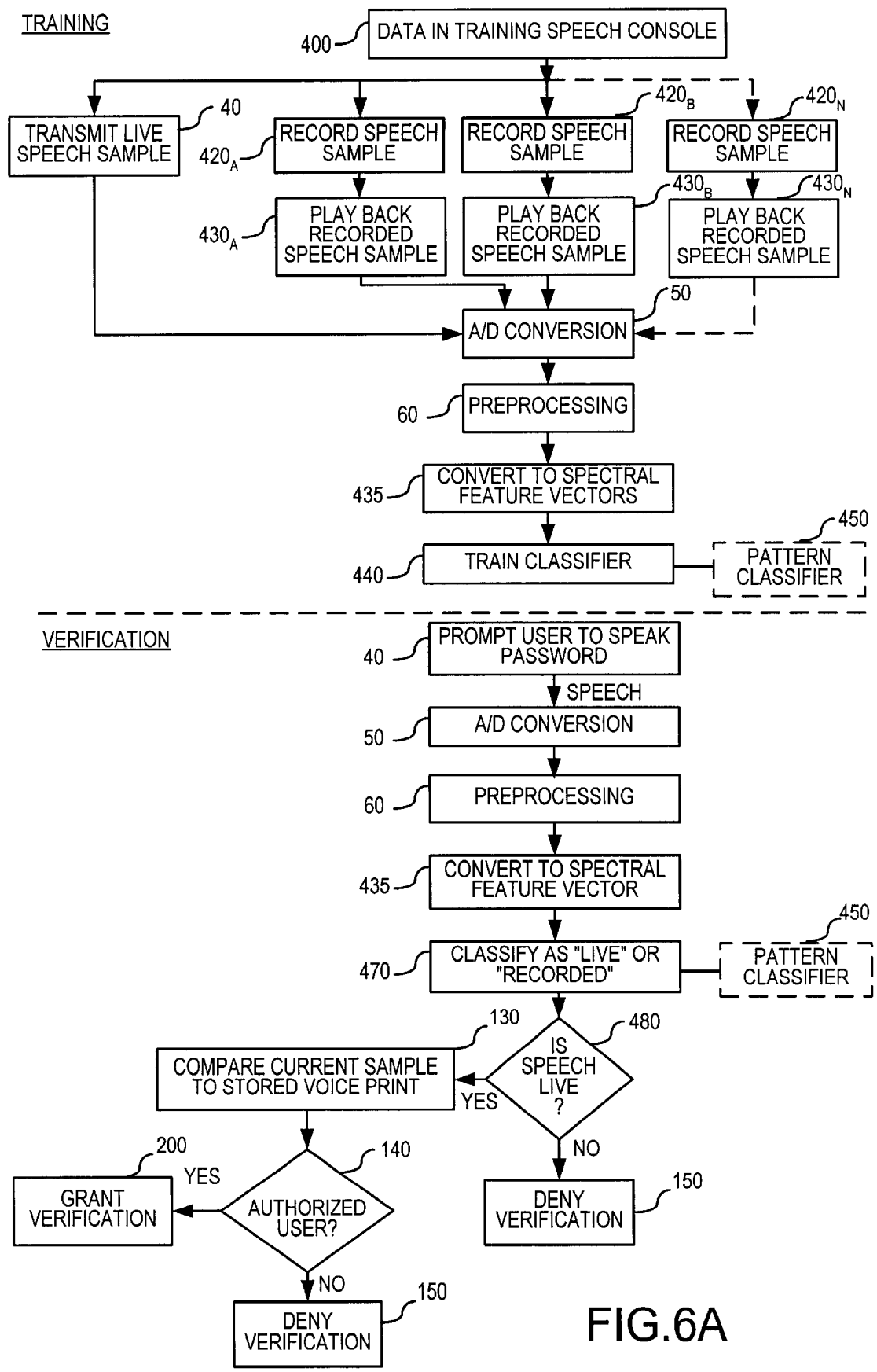
FIG. 6A is a block diagram of a preferred embodiment of the present invention utilizing a trained classifier to distinguish between live and recorded voice samples and an ASR system to verify that a user is authorized.

FIG. 6A illustrates a preferred embodiment of the present invention. The training component begins by obtaining 400 a training speech sample. Again, it is preferred that each training speech sample provides a good phoneme exemplar set and that a plurality of speech samples be obtained to provide the most complete set of training data possible to pattern classifier 450.

It is advantageous to simultaneously capture the live and recorded speech samples rather than having a test subject repeat a particular phrase. A simultaneous capture provides a more accurate data set for comparison by pattern classifier 450. Accordingly, the live training speech sample is transmitted 410 in parallel with its recording 420 and playback 430. It is also preferred that the training sample be recorded $420_{A-N}$ and played back $430_{A-N}$ in parallel by as many recording devices (A–N) as possible. This provides pattern classifier 450 with a more complete set of training data for comparison to live speech.

Most pattern classifiers cannot be trained directly with speech samples. Accordingly, in this preferred embodiment, the live speech sample and all replayed speech samples are converted 50 from analog to digital and preprocessed 60. The preprocessed speech is then converted 435 into spectral feature vectors using standard feature extraction techniques, such as: mel-frequency analysis based on cepstral coefficients; FFT-based cepstral coefficients; linear prediction derived cepstral coefficients; and pole-filter cepstral coefficients.

It is preferred that pole-filtered cepstral coefficients as derived in FIG. 5 (blocks 224 & 226) be employed. However, any other original signal characteristic that will be altered by the recording and playback procedure can be used to train pattern classifier 450. Recording and playback creates nonlinear distortion and nonharmonic frequencies. Therefore, any characteristic that will capture the nonlinear signal distortion content or nonharmonic frequency content can be used.

Any standard pattern classifier 450 may be used in the present invention. Examples of pattern classifiers include: vector quantization, Gaussian Mixture Model, Hidden Markov Model and Neural Tree Network. Vector quantization, Gaussian Mixture Model, and Hidden Markov Model techniques are respectively explained in "Fundamentals of Speech Recognition," chp. 3, L. Rabiner and B-H Juang, Prentice Hall, Englewood Cliffs, N.J., 1993; U.S. patent application Ser. No. 08/976,280, "Voice Print System and Method"; and "A Tutorial on Hidden Markov Models and Selected Applications in Speech Recognition," Proceedings of IEEE, vol. 777 (2), pp. 257–86, 1989, each of which are herein incorporated by reference.

A preferred pattern classifier 450 in this embodiment is a Neural Tree Network (NTN). The NTN is a hierarchical classifier that uses a tree architecture to implement a sequential linear strategy. Specifically, the training data for a NTN consists of data from live speech samples, labeled as "one," along with data from recorded and replayed samples labeled as "zero." During training 440, the NTN learns to distinguish regions of feature space that belong to live speech from those that are more likely to belong to recorded speech. These regions of feature space correspond to leaves in the NTN that contain probabilities. These probabilities represent the likelihood of live speech having generated data that falls within that region of feature space.

In this preferred embodiment, NTN modeling is performed using the following forward pruning criteria: (a) maximum depth of four; and (b) pruned nodes containing less than 10% of data vectors at the root. The "live" and "recorded" speech data are processed separately and their feature vectors are stored in separate files. The functioning of NTN networks with respect to speaker recognition is disclosed in K. R. Farrell, R. J. Mammone, and K. T. Assaleh, "Speaker Recognition using Neural Networks and Conventional Classifiers", *IEEE Trans. Speech and Audio Processing*, 2(1), part 2 (1994); U.S. patent application Ser. No. 08/159,397, filed Nov.29, 1993, entitled "Rapidly Trainable Neural Tree Network"; U.S. patent application Ser. No. 08/479,012 entitled "Speaker Verification System"; U.S. patent application Ser. No. 08/976,280, entitled "Voice Print System and Method"; U.S. patent application Ser. No. 08/827,562 entitled "Blind Clustering of Data With Application to Speech Processing Systems", filed on Apr. 1, 1997, and its corresponding U.S. Provisional Application No. 60/014,537 entitled "Blind Speech Segmentation", filed on Apr. 2, 1996, each of which is incorporated herein by reference in its entirety. In another preferred embodiment a combination of a Neural Tree Network and a Gaussian Mixture Model can be used as described in U.S. patent application Ser. No.08/976,280, "Voice Print System and Method," previously incorporated herein by reference.

The verification component illustrated in FIG. 6A includes reference to a text-dependent ASR system. It will be appreciated that this embodiment may be used independently or in conjunction with either a text-dependent or text-independent ASR system 20 as classification is not dependent on the user speaking any particular passwords. It may also be employed in either of the system configurations depicted in FIGS. 1A and 1B. This embodiment is particularly well-suited to a home-detention system as it could be used to combat cooperative fraud such as where the confined person purposefully records passwords to be replayed by a cohort.

The verification component of the embodiment illustrated in FIG. 6A begins with ASR system 20 prompting 40 the user to speak a password. Preferably, the user has already enrolled in the ASR system using the password as described in connection with the enrollment component of FIG. 4B. The user's response is converted from analog to digital 50 and preprocessed 60. The digitized sample is then converted to a spectral feature vector 435. Pattern classifier 450 classifies the input vector as either "live" (class 1) or "recorded" (class 0). This comparison is preferably based in part on a comparison of nonlinear distortion and nonharmonic frequency content in the sample.

If an NTN classifier is used, the NTN scores for individual feature vectors are accumulated across speech samples by an NTN scoring algorithm. If the classifier 450 decides 480 that the speech is recorded, verification is denied 150. Within the classifier, the threshold for deciding whether a particular sample should be classified as recorded can be varied depending on the level of security desired and the users' willingness to tolerate false denials of verification. If the speech is classified as live, ASR system 20 compares 130 the current sample characteristics to the voice print obtained during enrollment. If ASR system 20 determines 140 that there is a match, verification is granted 200. If no match is found, verification is denied 150.

FIG. 6 illustrates a preferred embodiment using a single pattern classifier 450. This assumes the use of a "discriminant" classifier, which can be trained using two classes of data and can learn to discriminate between them. It is also recognized, though not preferred, that two "nondiscriminant" classifiers could be used. One classifier is trained using "live" speech samples and the other using recorded speech samples. A verification decision is then made based on a comparison of both classifier "scores" given to a particular sample. Gaussian Mixture Model, Hidden Markov Model, and Vector Quantization are all examples of nondiscriminant pattern classifiers.

4. Audio Watermarking—Detailed Description

Figure 7:
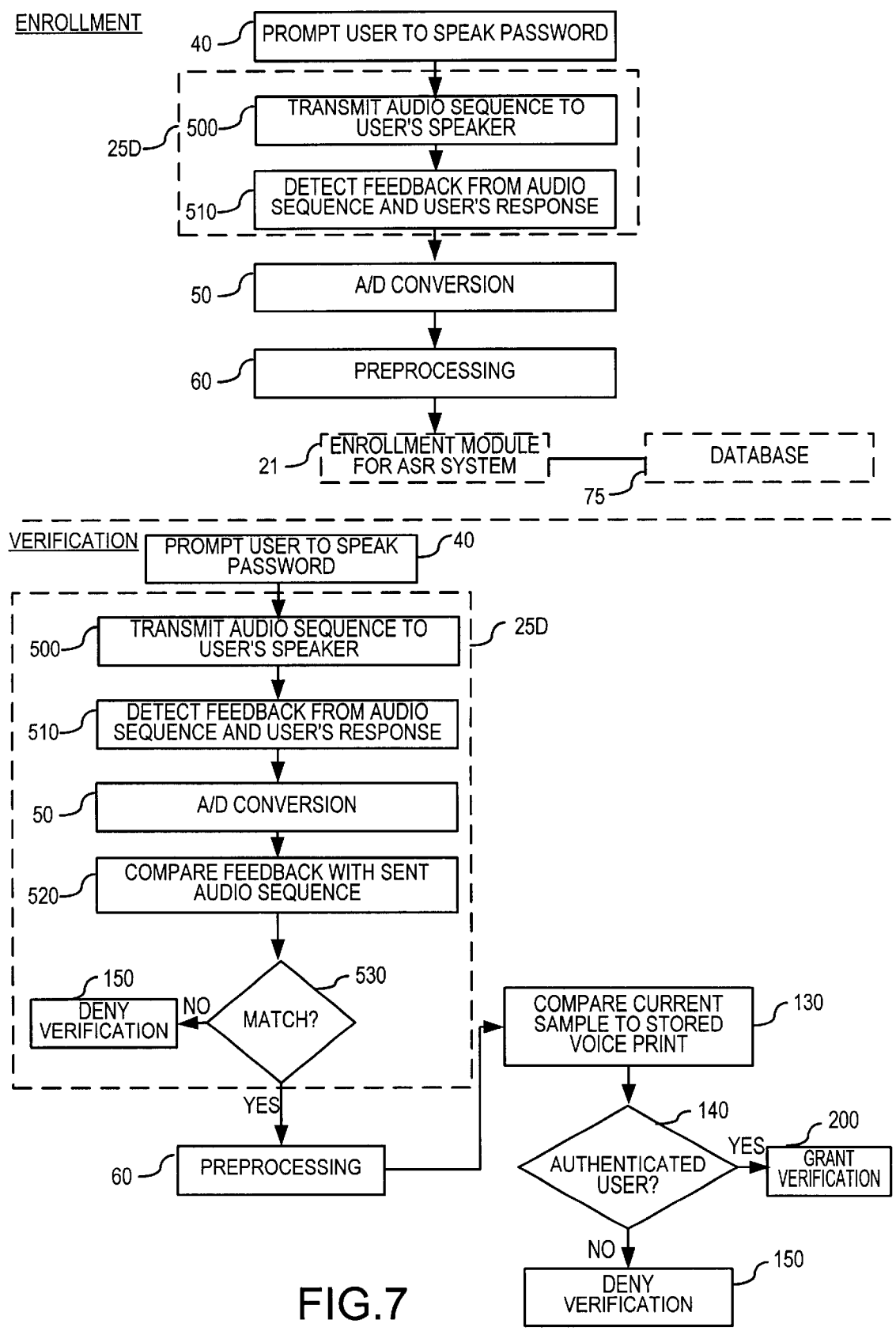
FIG. 7 is a block diagram of an embodiment of the present invention utilizing an audio watermark to detect a recorded voice.

FIG. 7 illustrates another embodiment of the present invention employing recording device detection module 25D, which uses an "audio watermark" to detect whether a speech sample is a recording. In this embodiment, an audio sequence, or "watermark," is created and transmitted to the user's speaker 11 during each user enrollment and verification attempt. The audio sequence then "marks" each speech sample provided by the user. The audio watermark is used to determine whether a recording of a previous enrollment or verification attempt is being employed. This embodiment may be employed with either of the system configurations illustrated in FIGS. 1A and 1B.

The enrollment component of this embodiment begins by prompting 40 the user to speak a password. An audio sequence is then transmitted 500 to the user's speaker 11. The audio sequence can comprise any audible signal, including multi-frequency (MF) signals, a frequency sweep, a "chirp tone" (where the frequency is varied from a low frequency to a high frequency), a Dual Tone Multi-Frequency (DTMF) signal. It is preferred to use a DTMF signal.

It is important that each audio sequence be highly unique. Although many techniques will be apparent to those skilled in the art, this can be accomplished by generating a series of DTMF tones corresponding to the last digits of the minutes, seconds, and milliseconds of the current time. For example, if the current time in hour:minute:second: millisecond format was 10:15:27:200, then a DTMF tone sequence corresponding to the numbers 5,7,0 is generated. Adding another digit to the sequence increases the uniqueness of the sequence ten-fold. A DTMF signal corresponding to each number can be generated by reference to the following standard table:

| STANDARD DTMF FREQUENCY TABLE: | |
|---|---|
| Code | Tone Pair Frequencies (Hz) |
| 1 | 697,1209 |
| 2 | 697,1336 |
| 3 | 697,1447 |
| 4 | 770,1209 |
| 5 | 770,1336 |
| 6 | 770,1477 |
| 7 | 852,1209 |
| 8 | 852,1336 |
| 9 | 852,1477 |
| 0 | 941,1336 |
| * | 941,1209 |
| # | 941,1477 |

It is also preferred that the audio sequence be transmitted directly after the user is prompted to speak his/her password. Typically, an ASR system 20 prompts a user for his/her password with beep or tone. If the audio sequence is sent during the two or three hundred milliseconds before the user can react and begin speaking, it is easier to detect the audio sequence when it is fed back through the user's microphone. Alternatively, the audio sequence can be transmitted while the user is speaking. This has the advantage of a greater likelihood that the audio sequence will be recorded along with the password; however, it makes filtering of the feedback from the audio signal more difficult.

In most microphone/speaker combinations, there is some acoustic feedback between the microphone and speaker. For example, some acoustic feedback occurs between the speaker and microphone of a telephone handset. If the audio sequence is transmitted at a high enough level, it will feedback through the user's microphone 10 and can be detected 510 along with the user's speech sample by recording device detection module 25D. The audio sequence should not be so loud, however, to annoy the user or alert an imposter of its presence.

Once the feedback from the audio sequence and the user's speech sample are detected 510, they are converted, if necessary, from analog to digital 50 and preprocessed 60 as previously described herein. The sample is then transmitted to enrollment module 21 of ASR system 20. Again, it is preferred that the user provide several enrollment samples for each password to be employed. Enrollment module 21 of ASR system 20 creates a voice print from the user's speech samples for each password and saves it in database 75.

The verification component of this embodiment begins by prompting 40 the user to speak a password. An audio sequence is transmitted 500 to the user's speaker 11 as described above. The feedback from the audio sequence and the user's response are detected 510, converted from analog to digital 50.

The feedback from the audio signal is then compared 520 with the audio sequence transmitted during the current verification attempt. If, as preferred, a DTMF audio signal was sent directly after the user was prompted, the detected sample contains the feedback from the audio signal in the leading parts of the sample, followed by the actual voice password. The leading part of the sample is then analyzed to detect the expected tone sequence. First, the tone sequence is separated into individual tones by detecting pause (low or no energy) regions between the tones. Then, each tone is detected using standard frequency analysis techniques such as FFT and matching the frequency contents with the DTMF frequency content table (described above).

It is expected that if an unauthorized user recorded a previous enrollment or verification attempt by an authorized user, he/she also recorded the audio watermark therein. When he/she plays back the recording in response to a prompt 40 for a password, he/she also plays back that earlier audio sequence, which is superimposed on the audio sequence sent for the current verification attempt. Therefore, if it is determined 530 that the sent audio sequence does not closely match the received audio sequence, a recording is suspected and verification is denied 150.

The threshold for a "match" may be varied depending on the communication channel employed, level of security desired, and the users' tolerance of false denials of verification. For example, in some applications detecting three of four sent tones constitutes a match. In others, detection of all sent tones may be required. In addition, a different threshold setting may be required if an audio sequence is used that does not comprise separate tones.

If a match is detected, the current sample is preprocessed. ASR system 20 then compares 130 the current sample characteristics to the voice print stored for the current password during enrollment. If the ASR system determines 140 that the current sample characteristics match the stored voice print, verification is granted 200. Otherwise, verification is denied 150.

It will be recognized by those skilled in the art that some or all of the preceding embodiments of the present invention may be used in combination either serially or in parallel. In addition, when the preceding embodiments are used in combination, an overall decision whether to deny verification can be derived in several different ways. For example, a strict decision making scheme could be employed whereby if the user is denied verification under any technique, overall verification is denied. Alternatively, overall verification could be denied only if a recording is detected under a preset number of techniques. In addition, an average of "confidence scores" generated by each technique could be employed to make the overall decision whether to deny verification.

Figure 8:
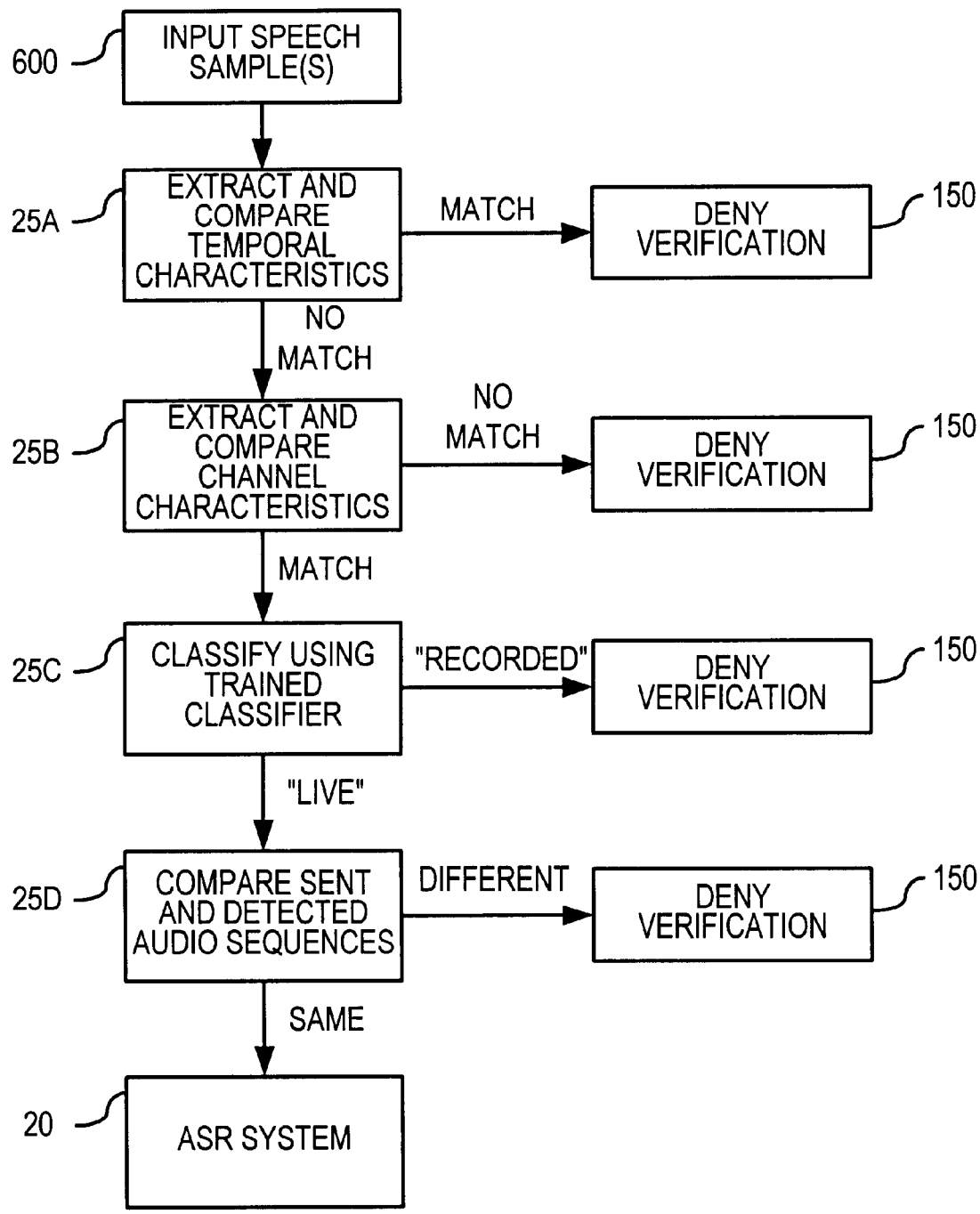
FIG. 8 is a block diagram of a preferred embodiment of the present invention utilizing in serial combination the techniques illustrated in FIGS. 2, 4, 6 and 7.

FIG. 8 illustrates an embodiment of the present invention whereby four preceding embodiments of the present invention are used in serial combination with a strict decision making scheme. While all four embodiments are connected in serial fashion, it will be appreciated by one of ordinary skill in the art that any two or three embodiments may be combined in this manner. The embodiment illustrated in FIG. 8 assumes that the enrollment and testing discussed with relation to FIGS. 2, 4, 4A–C, 6, and 7 have already been accomplished.

A speech sample is input 600 from an unknown source. The sample is fed to recording device detection module 25A, which extracts a temporal characteristics set from the sample as previously discussed in relation to FIG. 2. If the extracted characteristics set closely matches any previously stored characteristics set, verification is denied 150. If no match is detected, the sample is transmitted to the next recording device detection module, 25B.

Recording device detection module 25B extracts a channel characteristics set from the sample and compares it to previously stored sets as discussed in relation to FIG. 4. Recording device detection module 25B can comprise any of the preferred embodiments illustrated in FIGS. 4A, 4B, and 4C. If module 25B fails to detect a match with previously stored channel characteristics sets, verification is denied 150. Otherwise, the sample is transmitted to recording device detection module 25C.

Module 25C employs a pattern classifier as discussed in relation to FIGS. 6 and 6A. If the sample is classified as "recorded," verification is denied 150. If the sample is classified as "live," it is transmitted to recording device detection module 25D.

In this embodiment, an audio watermark must have been transmitted after the user was prompted to generate the speech sample. Module 25D compares the sent audio sequence to the feedback from that sequence as discussed in relation to FIG. 7. If the sent audio sequence and feedback signal do not match, verification is denied. If a match is detected, the sample is transmitted to the ASR system 20 for verification of the user's voice.

It should be recognized that the order of operation for the different recording device detection modules is not critical. Nor is it necessary that ASR system 20 be employed or that, if employed, ASR system follow the recording device detection modules 25A–D.

Figure 8A:
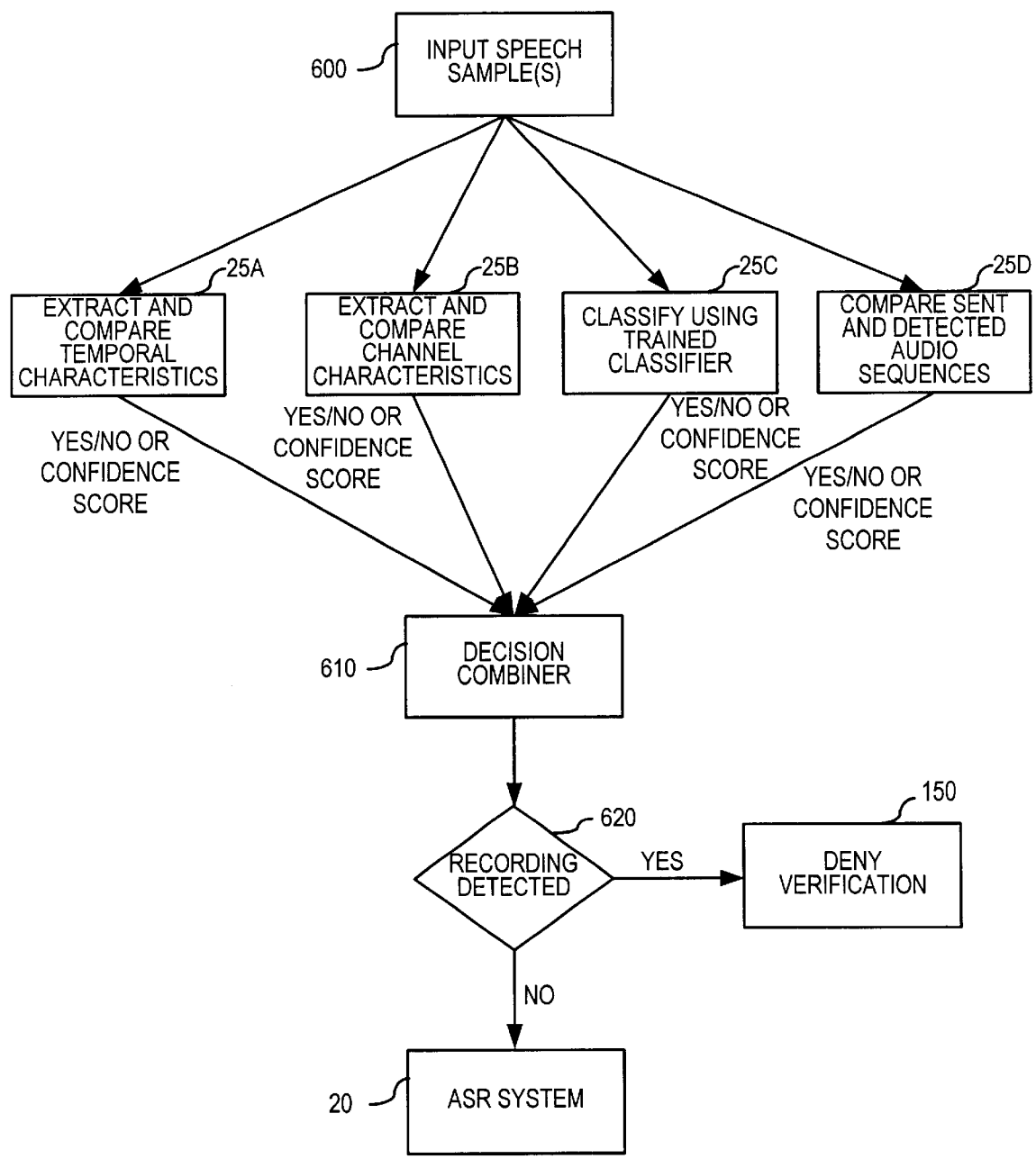
FIG. 8A is a block diagram of a preferred embodiment of the present invention utilizing in parallel combination the techniques illustrated in FIGS. 2, 4, 6 and 7.

FIG. 8A illustrates another embodiment of the present invention wherein the recording device detection modules 25A–D are used in parallel combination with an alternative decision making scheme. Again, the embodiment illustrated in FIG. 8A assumes that the enrollment and testing discussed with relation to FIGS. 2, 4, 4A–C, 6, and 7 have already been accomplished.

A speech sample is input 600 to all four recording device detection modules 25A–D. Each module 25A–D analyzes the speech sample and produces a decision, pursuant to the individual embodiments discussed with relation to FIGS. 2, 4, 4A–C, 6, and 7, whether the input speech sample is a recording. The output from each module can be in the form of a binary decision (i.e., yes or no). Alternatively, each module could produce a "confidence score" as to whether the sample is a recording.

A confidence score is a rating, between zero and one, for example, that represents the likelihood the sample is a recording. Each module calculates a confidence score differently. For example, assume a confidence score of 1 indicates a 100 percent certainty the sample is a recording and a confidence score of 0 represents a certainty that the sample is not a recording.

In the temporal characteristics embodiment, the distortion metric output "d" of the preferred DTW method of comparison can be converted to a confidence score by the simple exponentiation operation of confidence score "c"=$e^{-d}$. In that way, as the distortion metric decreases, indicating greater similarities between the temporal characteristics sets, confidence that the sample is a recording increases. Similarly, in the channel characteristics embodiment, the preferred comparison measurement, L2 norm distance "d," can be converted by the equation c=$e^{-d}$. It is preferred that a general function of the type $e^{-alpha*d}$ be employed because the alpha factor can be used to control the dynamic range compaction of distortion d.

A pattern classifier, such as the preferred NTN, inherently produces a confidence score between 0 and 1 and makes a binary decision based on a predetermined threshold. Further, a simple ratio suffices as a confidence score for the audio watermark embodiment. For example, if four DTMF tones are sent as the audio watermark and only three are detected in the feedback signal, a confidence score of one mismatched tone out of four, or 0.25, is produced. The preceding methods for calculating confidence scores are merely exemplary as one of ordinary skill in the art will recognize others. Any algorithm for producing a confidence score relative to the probability the sample is a recording is sufficient.

The output from each module 25A–D is fed to decision combiner 610. Decision combiner 610 may be programmed to make decisions based on any desired criteria. For example, if the recording device detection modules 25A–D output binary decisions, decision combiner 610 could require only that a certain number of modules (e.g., 2 out of 4) output a decision that the sample is a recording. Alternatively, if modules 25A–D output confidence scores, decision combiner 610 could make a decision based on an average of the confidence scores and a predetermined confidence threshold. In addition, a weighted average of confidence scores could be employed if, in a particular application, one of the modules 25A–D is considered more important or reliable than others.

If decision combiner decides 620 that a recording has been detected, verification is denied 150. Otherwise, the sample is transmitted to ASR system 20. Again, it should be recognized that it is not necessary that ASR system 20 be employed or that, if employed, ASR system follow the recording device detection modules 25A–D.

In either of the embodiments illustrated by FIGS. 8 and 8A, all four recording device detection modules 25A–D do not need to be used. Any combination of two, three, or four of those modules is sufficient. In addition, several modules of the same embodiment could also be employed. For example, separate modules 25A could be employed to analyze loudness contour and pitch contour. Further, any of the embodiment illllustrated in FIGS. 4A–C could be joined in combination.

Although each module 25A–D is depicted in FIGS. 8 and 8A as receiving the same inputted speech sample, as described with relation to FIGS. 2, 4, 4A–C, 6, and 7, the enrollment and/or training component for each module differs. For clarity, module 25A requires that temporal characteristics sets for previous enrollment or verification attempts be extracted and stored. Module 25B requires that at least one channel characteristics set be extracted and stored from, depending on the particular embodiment, an enrollment sample and/or a previous verification sample. Module 25C requires that a pattern classifier be trained with live and recorded speech samples. Finally, module 25D requires that an audio sequence be transmitted after the user is prompted to speak a password.

It will be appreciated by one of ordinary skill in the art that the present invention can be employed in applications other than the preferred embodiments set forth herein. For example, the present invention can be used to detect whether a recording is being used over a communications channel regardless of whether an ASR system is also employed. Also, in any of the embodiments described herein, if a user is denied verification, the user could be prompted multiple times to reattempt verification before a final decision regarding ultimate verification is made. In addition, it will be recognized that the ASR system 20 could be used before the user passes the test of recording device detection system 25. Further, in any embodiment where recording device detection system is used in conjunction with ASR system 20, they may be employed either serially or in parallel.

Consequently, variations and modifications commensurate with the above teachings, and within the skill and knowledge of the relevant art, are part of the scope of the present invention. It is intended that the appended claims be construed to include alternative embodiments to the extent permitted by law.

We claim:

1. A method for verifying that a detected speech sample is live and not a recording comprising:

detecting a first speech sample from a known person;

extracting temporal characteristics from the first speech sample to create a first characteristics set;

detecting a second speech sample;

extracting the temporal characteristics from the second speech sample to create a second characteristics set;

comparing the first and second characteristics sets and denying verification if the first and second characteristics sets do not match within a preset tolerance, wherein the denial of verification indicates that the second speech sample is a recording creating a voice print from the first sample;

comparing the second sample to the voice print and determining that the known person generated the second sample if the second sample matches the voice print within a preset tolerance detecting a third speech sample;

extracting the temporal characteristics from the third speech sample to create a third characteristics set;

comparing the third characteristics set to each of the first and second characteristics sets; and denying verification if the third characteristics set do not match either of the first or second characteristics sets within a preset tolerance, wherein the denial of verification indicates that the third speech sample is a recording producing a first comparison score during the step of comparing the second sample to the voice print;

producing a second comparison score during the step of comparing the third sample to the voice print;

comparing the first and second comparison scores and denying verification if the first and second comparison scores match within a preset tolerance, wherein the denial of verification indicates that the third voice sample is a recording.

2. A method for verifying that a detected audio sample is live and not a recording, comprising:

detecting a first audio sample over a prescribed channel during a first communications session;

extracting channel characteristics from the first sample to create a first characteristics set;

detecting a second audio sample during a second communications session;

extracting the channel characteristics from the second sample to create a second characteristics set; and denying verification if the first and second characteristics sets do not match within a preset tolerance, wherein the denial of verification indicates that the second audio sample is a recording.

3. A method for verifying that a detected audio sample is live and not a recording, comprising:
   detecting a first audio sample;
   extracting channel characteristics from the first sample to create a first characteristics set;
   detecting a second audio sample;
   extracting the channel characteristics from the second sample to create a second characteristics set;
   denying verification if the first and second characteristics sets do not match within a preset tolerance, wherein the denial of verification indicates that the second audio sample is a recording
   detecting a third audio sample;
   extracting the channel characteristics from the third audio sample to create a third characteristics set;
   comparing the third characteristics set to each of the first and second characteristics sets; and
   denying verification if the third characteristics set does not match both of the first and second characteristics sets within a preset tolerance.

4. The method of claim 3, wherein the detecting of the first, second, and third audio samples are performed within a single communications session.

5. A system for verifying that a detected audio sample is live and not a recording comprising:
   a detector for detecting a first audio sample from a known source, a second audio sample and a third audio sample;
   an extraction module, operatively connected to the detector, adapted to extract a first set of channel characteristics from the first audio sample, a second set of channel characteristics from the second audio sample; and a third set of channel characteristics from the third audio sample;
   a computer processor, operatively connected to the extraction module, adapted to compare the first and second sets of channel characteristics and to deny verification if the first and second sets of channel characteristics do not match within a preset tolerance, wherein the denial of verification indicates that the second audio sample is a recording and the computer processor is adapted to compare the third set of channel characteristics to each of the first and second sets of channel characteristics and to deny verification if the third set of characteristics fails to match either of the first or second sets of characteristics within a preset tolerance, wherein the denial of verification indicates that the third audio sample is a recording.

6. A system for verifying that a detected audio sample is live and not a recording, comprising:
   a detector for detecting a first audio sample from a known source during a first communications session and for detecting a second audio sample during a second communications session;
   an extraction module, operatively connected to the detector, adapted to extract a first set of channel characteristics from the first audio sample and to extract a second set of channel characteristics from the second audio sample; and
   a computer processor, operatively connected to the extraction module, adapted to compare the first and second sets of channel characteristics and to deny verification if the first and second sets of channel characteristics do not match within a preset tolerance, wherein the denial of verification indicates that the second audio sample is a recording.

* * * * *